(12) United States Patent
Ginesi et al.

(10) Patent No.: US 7,409,024 B2
(45) Date of Patent: Aug. 5, 2008

(54) PROCESS FOR PROVIDING A PILOT AIDED PHASE SYNCHRONIZATION OF CARRIER

(75) Inventors: Alberto Ginesi, Noordwijk (NL); Domenico Fittipaldi, Pisa (IT); Alan Bigi, Rome (IT); Riccardo De Gaudenzi, Er Leiden (NL)

(73) Assignee: Agence Spatiale Europeenne, Paris (FR)

( * ) Notice: Subject to any disclaimer, the term of this patent is extended or adjusted under 35 U.S.C. 154(b) by 710 days.

(21) Appl. No.: 10/930,864

(22) Filed: Sep. 1, 2004

(65) Prior Publication Data

US 2005/0111603 A1    May 26, 2005

(30) Foreign Application Priority Data

Sep. 5, 2003    (EP) .................... 03077810

(51) Int. Cl.
 *H04L 7/04*    (2006.01)
(52) U.S. Cl. ...................................... 375/362
(58) Field of Classification Search ............ 375/316, 375/340, 362
See application file for complete search history.

(56) References Cited

U.S. PATENT DOCUMENTS

| | | | | |
|---|---|---|---|---|
| 6,134,260 A * | 10/2000 | Bottomley et al. | .......... | 375/130 |
| 6,415,253 B1 * | 7/2002 | Johnson | .............. | 704/210 |
| 6,498,805 B1 * | 12/2002 | Brown et al. | ............ | 375/147 |
| 6,680,987 B1 * | 1/2004 | Beidas et al. | ............ | 375/343 |
| 2001/0006540 A1 * | 7/2001 | Kim et al. | .............. | 375/340 |
| 2002/0122505 A1 * | 9/2002 | Avidor et al. | ............ | 375/329 |
| 2002/0176520 A1 * | 11/2002 | Heegard et al. | .......... | 375/327 |
| 2003/0095610 A1 * | 5/2003 | Liang et al. | ............. | 375/316 |
| 2003/0142734 A1 * | 7/2003 | Black et al. | ............. | 375/149 |
| 2003/0174786 A1 * | 9/2003 | Chiu et al. | .............. | 375/316 |
| 2004/0252229 A1 * | 12/2004 | Jiang et al. | ............. | 348/385.1 |

OTHER PUBLICATIONS

V. Simon et al., Phase Noise Estimation Via Adapted Interpolation, IEEE Global Telecommunications Conference, Nov. 25, 2001, pp. 3297-3301.
T. Asahara et al., An Improved Pilot Symbol Assisted Coherent Detection Scheme for Rician Fading Channels, IEICE Transactions on Communications, vol. E82-B, No. 12, Dec. 1999, pp. 2041-2048.
J. Cavers, An Analysis of Pilot Symbol Assisted Modulation for Rayleigh Fading Channels, IEEE Transactions on Vehicular Technology, Nov. 1991, pp. 686-693.
U. Mengali et al., Synchronization Techniques for Digital Receivers, 1997, XP0002274718, pp. 284-286.

* cited by examiner

*Primary Examiner*—David C. Payne
*Assistant Examiner*—Leon-Viet Q Nguyen
(74) *Attorney, Agent, or Firm*—Clark & Brody

(57) ABSTRACT

A process for providing a phase synchronization of a pilot aided carrier of an input digital signal z(k), the signal z(k) having signal fields of $L_s$ symbol signals, namely a block of $L_p$ pilot symbol signals $Z^P_{(k)}$ and a data field of $(L_s-L_p)$ data symbol signals $Z^d_{(k)}$, and characterized for each signal field (1) by:
  extracting the pilot symbol signals $Z^P_{(k)}$ and
  calculating an unwrapped phase estimate $\hat{\theta}(lL_s)$ over the pilot block of said signal field (1) and:
  interpolating said unwrapped phase estimates of successive signal fields (l, +1 . . . ) with a Wiener interpolator having M taps to obtain interpolated phase estimates having a Minimum Mean Square Error;
  providing linear interpolation between said interpolated phase estimates to obtain phase correction estimates $(\hat{\theta}(k_s))$ over the data field of said signal fields;
  calculating from said phase correction estimates $(\hat{\theta}(k_s))$ a phase correction $(e^{-j\hat{\theta}(k_s)})$ to be applied to said signal Z(k).

6 Claims, 15 Drawing Sheets

PROCESS FOR PROVIDING A PILOT AIDED PHASE SYNCHRONIZATION OF CARRIER

FIELD OF THE INVENTION

The present invention relates to a pilot-aided carrier synchronization scheme particularly suited to broadband satellite communication systems, as the ones concerning the new DVB-S2 standard.

BACKGROUND OF THE INVENTION

It has been shown in the article by A. GINESI and R. DE GAUDENZI "Carrier Phase Synchronization Techniques for Broadband Satellite Transmissions" DVB-S2 Technical doc, Geneva, 21 Mar. 2003 that classical techniques for carrier phase recovery in the presence of a strong phase noise as the one specified by the DVB-S2 committee, are not effective as they are affected by both excessive jitter as well as cycle slips. Other pilot aided techniques, as described in the publication by HUGHES Networks Systems "Carrier Synchronization Solution for DVB-S2 Modem" DVB-S2 Technical doc, Geneva, 15 Jun. 2003 are more effective but they are much more complex and yet have to show a feasibility over the whole signal-to-noise ratio range required by the DVB-S2 applications.

BRIEF SUMMARY OF THE INVENTION

The present invention refers to novel carrier synchronization techniques for RF digital transmissions. In particular, the proposed algorithms are envisaged to be particularly advantageous when operating with a high level of transmitter/receiver oscillator's phase noise. This situation is typical of the consumer market where due to strong cost restrictions, low quality components have to be chosen.

As an example, the currently deployed LNB's (Low Noise Blocks) in the digital TV broadcast receiver terminals (DVB-S receivers) belong to this class of relatively low cost components. Re-using this low cost technology, the DVB-S2 standard aims at providing an increase of user data rates in the order of 30%, by exploiting state-of-the-art FEC (Forward Error Correction) techniques. As a result, the signal to-noise (SNR) ratio operating point of a given modulation and coding rate format is lowered thus stressing the operation of the carrier synchronization circuit. Classical synchronization schemes such as in the above identified publication by A. GINESI and R. DE GAUDENZI do not provide sufficient performance when in presence of the phase and thermal noise levels of the DVB-S2 environment, especially for modulation formats with 8 and 16 points. In fact, as shown in this publication, in these conditions the synchronizer undergoes a number of cycle slips in a relatively short time, and the phase jitter results to be in excess with respect the desired target. The proposed algorithms make use of regularly inserted pilot symbols with a total overhead around 2%. They provide a good carrier frequency and phase estimate with low jitter and no cycle slips. Furthermore, they are (at least for a set of the proposed algorithms) completely data modulation independent as they do not make any use of the transmit data. According to one of the proposed techniques, the carrier phase estimate is obtained by an optimum (in the minimum mean square error sense) interpolation of maximum likelihood pilot-based estimates, while the carrier frequency is obtained by holding the pilot-based estimates that are given by a simple delay-and-multiply PLL.

The synchronization schemes according to the present invention can also be advantageously applied to modulation formats that are difficult to synchronize as well as very sensitive to a carrier phase jitter as the non-linearity friendly 16-APSK and 32-APSK constellations. Also, the complexity of the proposed synchronizers is low when compared to other techniques such as in the above-referenced publication by HUGHES Networks Systems and the adaptation of frame-dependent modulation formats (as required in the Unicast application of DVB-S2) does not require any synchronizer re-configuration as opposed to the techniques in said publication by HUGHES Networks Systems thus easing the demodulator operations.

As known, a correct coherent signal demodulation requires a fairly precise estimate of the phase of the received signal carrier. This task is performed by a carrier recovery unit at the receiver side. In broadband satellite transmissions, the phase of the carrier is usually affected by a number of (linear) distortions which comprise: i) static channel phase rotations due to delay and/or the presence of transmit (TX) and receive (RX) conditioning filters, ii) slowly varying phase rotations due to channel fading and iii) TX and RX oscillator phase and phase noise.

A number of algorithms are available in literature to address the issue of carrier phase recovery (see the book by U. MENGALI and A. N D'ANDREA "Synchronization Techniques for Digital Receivers" 1997-Plenum Press-New York for a comprehensive literature review) for different modulation schemes. However, due to the recent findings in channel coding theory and the use of higher carrier frequencies, the need to study novel and more efficient carrier phase estimate techniques has received a new boost. In fact, since the introduction of Turbo codes (see for example C. BERROU et al: Near Shannon limit Error-Correcting Coding and Decoding: Turbo Codes"—Proceedings 1993 Int Conf. Comm. pages 1064-1070), the operating signal-to-noise ratios (SNR's) at which the synchronizers have to be able to work have considerably lowered, thus stressing their jitter performance.

Also, the carrier frequency is constantly moving upwards, due to the increasing demand of bandwidth by new services and the consequent congestion at more traditional frequencies. For example, in satellite systems, as the Ku band is becoming crowded, new systems are being developed to work at Ka and Q bands, which are to date still relatively unused.

However, as the carrier frequency increases, the contribution of the oscillators' phase noise to the total carrier phase distortion becomes much higher thus requiring new and faster carrier phase tracking schemes. In some cases the use of Pilot-Aided (PA) (or Pilot Symbol Aided) schemes is the only viable solution to the problem. In these schemes, a certain amount of pilot (known) symbols are interleaved with the data streams, in order to help the RX demodulation process. Pilot symbols are then discarded before the decoder.

The present invention relates to the case of PA algorithms. For the sake of understanding known as well as techniques according to the invention will be presented and their performance in terms of residual phase jitter RMS and cycle slips will be compared. Attention will be devoted particularly to DVB-S2-like applications, i.e. next generation satellite broadcast and unicast transmissions.

However, the algorithms that will be presented can easily be applied to other wireless or wireline applications where the issue of oscillators' phase noise is particularly important. Advanced coding schemes approaching the Shannon capacity bound will be considered when setting the transmission operative SNR, and a set of modulation schemes with spectral efficiency between 1 and 4 bit/s/Hz are analyzed. In particular, QPSK, 8PSK 16QAM and the more recent and non-linearity-friendly 4+12 APSK (R. de GAUDENZI et al: "High Power and Spectral Efficiency Coded Digital Modulation Schemes for non-Linear Satellite Channels" in $7^{TH}$ International ESA Workshop on digital Signal Processing Techniques for Space Applications, Sesimbra, Portugal, October 2001) will be investigated. The sensitivity study to residual carrier frequency errors is also carried out and an overall carrier (phase and frequency) recovery scheme is proposed and tested.

According to a first aspect, the invention relates to a process for providing a phase synchronization of a pilot aided carrier of an input digital signal, said signal comprising fields comprised of $L_s$ symbols, namely a block of $L_P$ pilot symbol signals $Z^P_{(k)}$ and a data field of $(L_s-L_P)$ data symbol signals $Z^d_{(k)}$, and characterized in that it comprised for each field (l):

calculating an unwrapped pilot phase estimate $\hat{\theta}_f^{(P)}(l)$.

initiating with $\hat{\theta}_f^{(P)}(l)$ a first digital phase locked loop ($DPLL_F$) implementing a phase estimate algorithm and calculating a forward phase trajectory $\theta_F(k)$ from the data symbol signals $Z^d_{(k)}$ of the data field (l), ks varying between 1 and $(L_s-L_P)$ over said data field (l), said forward phase trajectory $\hat{\theta}_F^{(P)}(l)$ being comprised of $(L_s-L_P)$ forward phase estimates $\hat{\theta}_F(ks)$ and initiating with $\hat{\theta}^{(P)}(l+1)$ a second digital phase locked loop ($DPLL_B$), implementing a phase estimate algorithm and calculating a backward phase trajectory $\hat{\theta}_B(ks)$ from the data symbol signals $Z^d(ks)$, of the same data field (l), ks varying between $(L_s-L_P)$ and 1 over said data field (l), said backward phase trajectory $\hat{\theta}_B(ks)$ being comprised of $(L_s-L_P)$ backward phase estimates $\hat{\theta}_B(ks)$.

from said phase trajectories calculating a phase correction ($e^{-j\hat{\theta}(ks)}$).

This correction will be applied to input signal Zk to generate a phase corrected input signal for the data symbol signals.

The pilot symbol signals do not require to be phase corrected, as they are discarded at the input of the decoder.

According to its first aspect, the invention relates also to a device for implementing the process comprising an input for receiving said input signal Z(k), a piloted switching device for directing the data signals $Z^d(k)$ to a shift register and the pilot symbols to a pilot phase estimator, and for reading the data signals $Z^d(k)$ of said shift register to input said first and second digital phase locked loop ($DPLL_F$, $DPLL_B$), an output of said estimator being connected to a second input of each of said digital phase locked loop ($DPLL_F$, $DPLL_B$), each of which having an output to generate a said phase trajectory.

According to a second aspect, the invention relates to a process for providing a phase synchronization of a pilot aided carrier of an input digital signal, said signal z(k) comprising pilot fields comprised of $L_s$ symbol signals, namely a block of $L_P$ pilot symbol signals $Z^P_{(k)}$ and a data field of $(L_s-L_P)$ data symbol signals $Z_{(k)}$, and characterized in that it comprised for each pilot field:

extracting the pilot symbol signals $Z^P_{(k)}$ calculating a phase estimate $\hat{\theta}(lL_s)$ over the pilot field from at least one pilot symbol signal of said pilot field interpolating said phase estimates of successive pilot fields with a Wiener interpolator having M taps to obtain interpolated phase estimates having a Minimum Mean Square Error. These taps are a function of the autocorrelation function of the carrier phase and of the signal-to-noise ratio providing linear interpolation between said interpolated phase estimates to obtain phase correction estimates calculating from said phase correction estimates $\hat{\theta}(k_s)$ a phase correction $e^{-j\hat{\theta}(k_s)}$ and apply it to said signal Z(k).

The article by SIMON et al. titled "Phase noise estimation via adapted interpolation" (IEEE Global Telecommunications Conference 25 Nov. 2001, pages 3297-3301 vol. XP001189712, PISCATAWA, N.J., USA) refers to the problem of estimating the phase noise process as in the present invention whereas the article by ASAHARA et al. "An improved pilot symbol assisted coherent detection scheme for rician fading channels" IEICE Transactions on Communications, Institute of Electronics Information, Tokyo, JP (December 1999, pages 2041-2048, ISSN 0916-8516) refers to the problem of estimating the fading process. Both have in common that they perform Wiener filter estimation over the complex samples of the phase noise (for SIMON et al.) and fading process (for ASAHARA et al.). The approach used in these two publications has two main drawbacks.

The first is that the estimation they perform is very much affected by the presence of a residual carrier frequency error. In the present invention a carrier frequency error would just add a linearly time varying term into the phase process being estimated which is easily interpolated by the Wiener filter. The same frequency error would cause a "helical-like" trajectory in the complex plane which is very difficult to be interpolated by the Wiener filter working on the complex samples. The second drawback regards complexity: the complex interpolation in these two publications needs a number of Wiener filters which is twice the number of filters that are needed in the present invention.

A further difference of SIMON et al. with respect the present invention is that SIMON et al. works with pilot fields made up with just one sample. No extension to pilot fields with more than one sample is contemplated.

BRIEF DESCRIPTION OF THE DRAWINGS

The invention will be described hereinbelow with reference to the attached drawings where:

FIG. 20 illustrates a phase interpolation technique, whereas

DETAILED DESCRIPTION OF THE INVENTION

Figure 1:
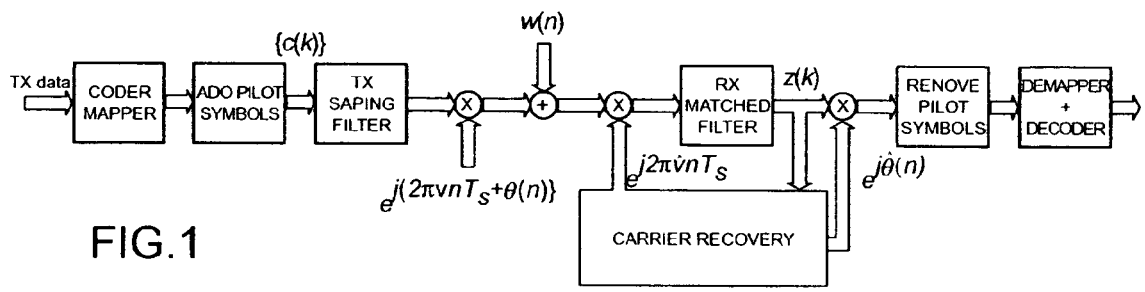
FIG. 1 is a system block diagram showing a block diagram of the overall communication system.

The overall transmission system under investigation together with the assumed system parameters are shown in FIG. 1, where the overall high-level system block diagram is depicted. In particular, this figure shows the complex baseband equivalent representation of the blocks of interest of the communication system. The transmission is sampled at a suitable sampling rate $F_s=1/T_s$ such that the Nyquist sampling criterion is met. Also, the sampling timing is synchronous with the symbol timing (i.e. there is an hidden timing recovery circuit which is assumed to be ideal) so that the samples z(k) at the matched filter output are symbol synchronous.

The transmit data are first encoded by a Forward Error Correction (FEC) which could be either block-based such as turbo and LDPC codes, or continuous such as convolutional codes. In the first case, the output of the encoder is made up by a sequence of codewords in blocks of $N_{FEC}$ bits. For example, in the case of the LDPC code of DVB-S2, $N_{FEC}=64800$ bits. The encoded bits are then mapped to a transmit constellation by a Mapper (which shares the same block as the encoder in FIG. 1). The constellations that will be considered here are QPSK, 8PSK, 16QAM and 4+12 APSK. For these constellations, with energy $C_2$, the transmit symbols belong to the following sets: QPSK: $\{e^{j\Phi_i}, \phi_i=\pi/4+i\pi/2, i=0, 1, 2, 3\}$, 8PSK: $\{e^{j\Phi_i}, \phi_i=i\pi/4, i=0, 1, \ldots, 7\}$, 16QAM: $\{\pm 1, \pm 3\} \cup \{\pm j, \pm 3j\}$. As for the 4+12 APSK modulation constellation (see the above cited publication by de GAUDENZI et al.), it is composed of two concentric rings of uniformly spaced $N_1=4$ and $N_2=12$ PSK points, respectively in the inner and outer rings.

Figure 2:
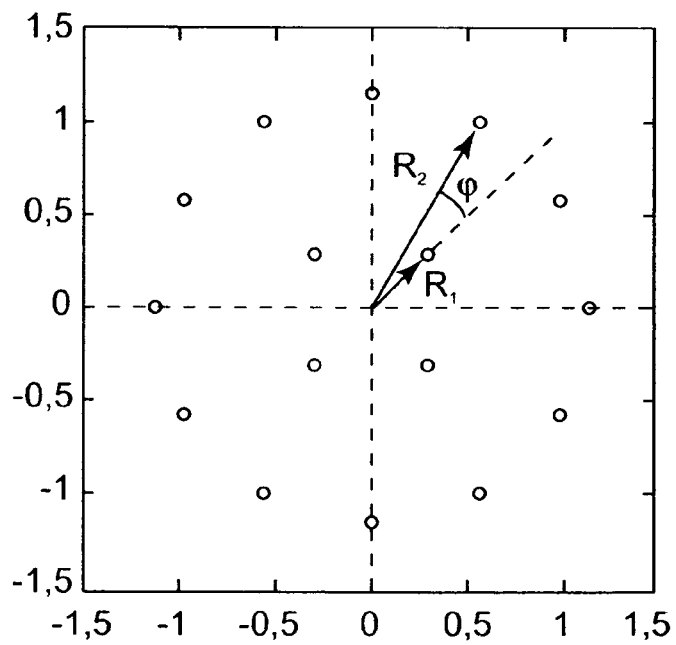
FIG. 2 illustrates the 4+12-ASPK generic signal constellation.

We define with $\rho=R_2/R_1$, where $R_2$, $R_1$ are the radii of the inner and outer rings respectively, and $\phi$ is the relative phase shift between the inner and outer ring PSK constellations (see FIG. 2). In the simulations, we have set $\rho=2.85$ and $\phi=0$.

Figure 3:
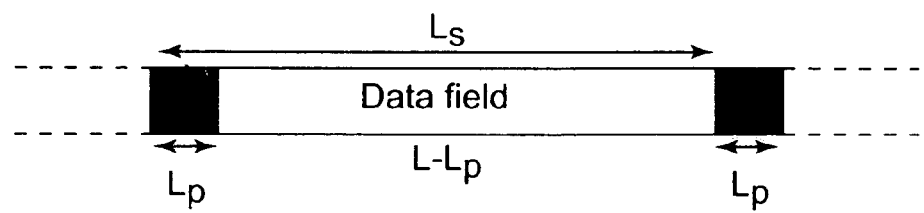
FIG. 3 represents the physical framing structure of a digital signal with regularly inserted pilot symbols.

The symbol rates at which the mapped symbols are generated are assumed to be between 10 and 50 Mbaud, but in the rest of the paper we will focus mainly on the 25 Mbaud rate. Following the Mapper, the transmit symbols are organized in regular channel framing structure, where periodically $L_p$ pilot (known) symbols are inserted. The period $L_s$ of the insertion of pilot symbols is also called slot length and the ratio $L_p/L_s$ is the physical layer framing overhead (see FIG. 3). For the synchronization schemes that will be presented, the modulation used on the pilot symbols is immaterial to the performance of the algorithm, but just to fix ideas we can assume that a QPSK constellation is used.

Following the pilot insertion block, the symbols are shaped by a transmit filter which is assumed to be a square root raised cosine filter with roll-off between 0.2 and 0.35 and impulse response g(t). Then, the so generated signal is transmitted on the channel that here is modeled as a distortion-less channel where a complex AWGN (Additive White Gaussian Noise) waveform w(n) with variance $$\sigma_w^2 = \frac{C_2}{E_s/N_0}$$

is added to the useful signal.

The SNR operating points which have been assumed for the different modulation schemes have been set according to the performance of the LDPC code presented in the HNS FEC proposal during the third round of DVB-S2 for QPSK, 8PSK and for 16 QAM/4+12 APSK. The following table summarizes the assumed operating SNR values for the different modulation schemes.

TABLE 1

Operating SNRs for the considered modulation schemes

| Modulation Scheme | $E_s/N_0$ (dB) |
|---|---|
| QPSK | 1 |
| 8PSK | 6.6 |
| 16QAM/16APSK | 10 |

Figure 4:
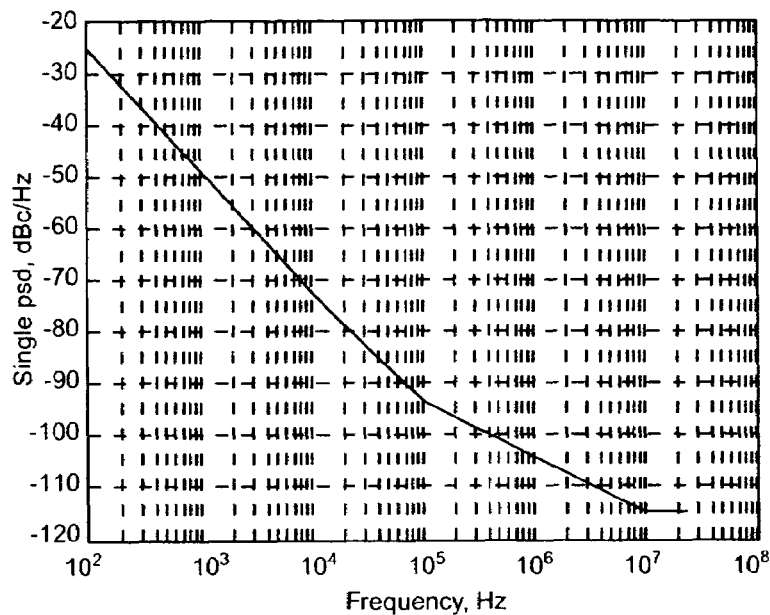
FIG. 4 represents an aggregate DVB-S2 phase noise mask for LNB+tuner.

A phase rotation is then added to the transmit signal in order to represent a carrier frequency error (term $2\pi\nu n T_s$) and the oscillators' phase noise (term $\theta(n)$). This latter is modeled as a zero-mean Gaussian variable with a low pass PSD (Power Spectral Density). In particular, the PSD suggested by the DVB-S2 standard is used for the tests reported here. This corresponds to the worst case PSD of the combined phase noise contribution of terminal satellite receivers' tuners and LNB's (Low Noise Blocks) and is sketched in FIG. 4. Although the present analysis is focused on this particular phase noise PSD, it is clear that the algorithms presented can easily be ported to work with other phase noise's PSDs. To be remarked that the PSD depicted in FIG. 4 represent the Single Side Band (SSB) PSD of the carrier with phase noise which can also be shown to correspond to the Double Side Band (DSB) of the phase noise process, under the assumption of small signals.

Figure 6:
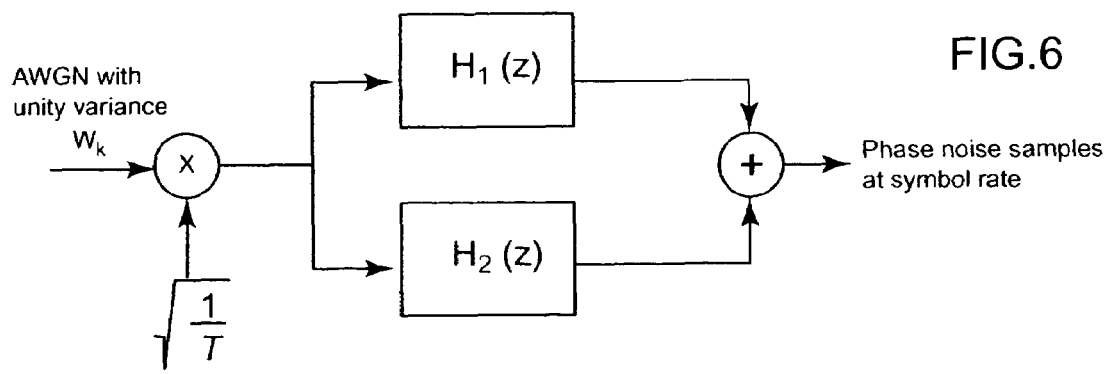
FIG. 6 shows a synthesis of the phase noise process.

For the time domain simulations that have been carried out, a time domain synthesis of the phase noise samples is required. To this purpose, a time domain synthetic model has been generated and its description is reported later in the description with FIGS. 6 to 8.

The received waveform samples r(n) can then be mathematically expressed as in (1)

$$r(n) = e^{j(2\pi\nu n T_s + \theta(n))} \sum_i c(i) g(nTs - iT) + w(n) \quad (1)$$

At the receiver input and as is known in the art, the signal is first de-rotated by an estimate of the carrier frequency error provided by the carrier recovery circuit, and then filtered by the matched filter (MF). The output of the matched filter is then synchronously decimated down to the symbol rate 1/T to provide an input digital signal z(k). No timing error is assumed, i.e. the issue of timing recovery is supposed to be ideally solved by a hidden timing recovery circuit. Assuming that the residual carrier frequency error $\Delta\nu = \nu - \hat{\nu}$ is much lower than the symbol rate so that intersymbol interference at the MF output can be neglected, the signal samples z(k) can be expressed as in (2)

$$z(k) = e^{j(2\pi\Delta\nu kT + \theta(k))} c(k) + n(k) \quad (2)$$

where the index k now represents the symbol time epochs and n(k) are the filtered noise samples at symbol rate.

The aim of the present invention is to provide at least a carrier phase recovery from said input signal z(k). The carrier recovery circuit of FIG. 1, takes as an input the samples z(k) corresponding to either the pilot symbols only or both the pilot symbols and the data symbols, depending on the particular carrier recovery scheme.

In all the cases, however, physical layer frame alignment is supposed to be known to the receiver so that the pilot symbols can be extracted in their right position. The output of the carrier recovery scheme consists of a frequency offset estimate $\hat{\nu}$ with which to de-rotate the received signal at the MF input, and a phase estimate $\hat{\theta}(k)$ to counteract the phase channel distortions. The signal samples, after de-rotation by the phase recovery algorithm, are then fed to the remaining part of the receiver where the samples corresponding to the pilot symbols are first discarded and the ones corresponding to the useful data are first de-mapped and then decoded by the FEC decoder to recover the information bits.

An important question is on what is the required accuracy achieved by the carrier phase synchronizer in order to limit the impact on performance to reasonable low SNR degradations. This is a quite difficult question to answer by analytical studies thus simulations have to be run with the given code/modulation scheme under investigations. Some insights on this directions are offered in the document by A GINESI, D. FITTIPALDI and De GAUDENZI, "DVB-S2: Overall Carrier Synchronization Strategy", DVB-S2 Technical doc, Geneva, May 14-15, 2003, for the LDPC code presented in the description of the HNS FEC proposal cited above. There it is shown that the signal to noise ratio SNR degradation of an 8PSK rate ⅔ modulation with a 2.1 degrees phase jitter is around 0.1 dB, while it grows to 0.17 dB for a jitter of 3 degrees.

For QPSK, it seems reasonable to double the phase jitters of 8PSK for a given SNR degradation. For 4+12 APSK, as there are 12 points in the outer ring, 8PSK phase jitters probably need to be scaled by 8/12=⅔. Table 2 shows a summary of the phase jitter requirements that are required to limit the performance degradation to about 0.2 dB, for the different modulation schemes.

Figure 5:
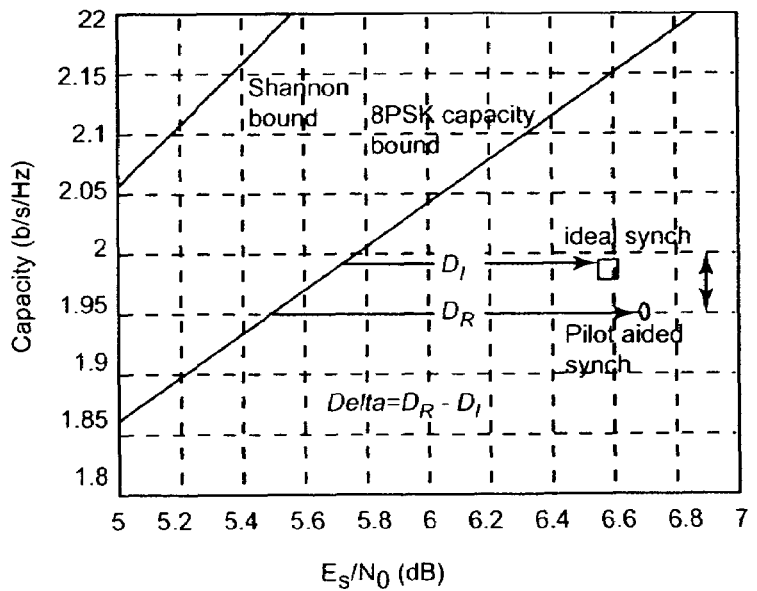
FIG. 5 illustrates the performance degradation computation due to a generic pilot-aided synchronization scheme.

As for the selected amount of pilot overhead, it is clear that the SNR degradation (due to the phase jitter) goes down as the pilot overhead increases (as the resulting phase jitter decreases), but also the SNR penalty due to the overhead itself increases. There exists an optimum point at which the total degradation due to phase jitter plus pilot overhead is minimized. To this end, one can compute the distance $D_I$ from the modulation constrained capacity bound of the ideal system (perfect synchronization and no pilots) and the one $D_R$ of the real system with SNR degradation due to the phase jitter and spectral efficiency degradation due to the pilots (see FIG. 5 for an example related to 8PSK), i.e. $rL_p/L_s$, where r is the modulation+code spectral efficiency. Ideally the optimum point should roughly be such that $(D_R - D_I)/2$ is equivalent to the SNR degradation due to the phase jitter, that means that same degradation is partitioned between overhead loss and jitter.

TABLE 2

Phase jitter RMS requirements for the different modulation schemes

| Modulation scheme | Phase jitter RMS requirement (degrees) |
|---|---|
| QPSK | 6-8 |
| 8PSK | 3-4 |
| 16QAM/16APSK | 2-2.6 |

Most of the simulation results that we will show refer to an overhead of around 2% as that seems to the optimum point for 8PSK with the DVB-S2 LDPC code.

For the phase noise synthesis as the total phase error RMS will be assessed, we devise a time domain synthesis of the phase noise process with PSD mask of FIG. 4. Since it is expected that the phase noise will only affect the phase recovery scheme (as we will see later, the proposed frequency recovery scheme is only marginally affected by the phase noise), and this latter works entirely at the symbol rate, the discrete phase noise process that will be synthesized is θ(k), i.e. the phase noise samples at symbol rate at the MF output. This simplification allows to considerably speeding up the simulation time, as well as simplify the synthesis process.

Two digital filters have been designed whose combined frequency response matches the target phase noise mask for the symbol rate value of 25 Mbaud. The approach that has been used is the least square error fit of the IIR filter amplitude frequency response to the target mask. Also, in order to better match the phase noise PSD below 1 kHz, an "ad-hoc design" filter has also been added in parallel (see FIG. 6).

The filters $H_1(z)$ and $H_2(z)$ have transfer functions $$H_1(z) = \frac{-4.7 \cdot 10^{-11}}{(z - 0.999975)^2} \quad (3)$$

$$H_2(z) = \frac{2.8 \cdot 10^{-6}(z - 1.103181)(z - 0.992015)}{(z - 0.991725)(z - 0.9999985)(z - 0.563507)} \quad (4)$$

Figure 7:
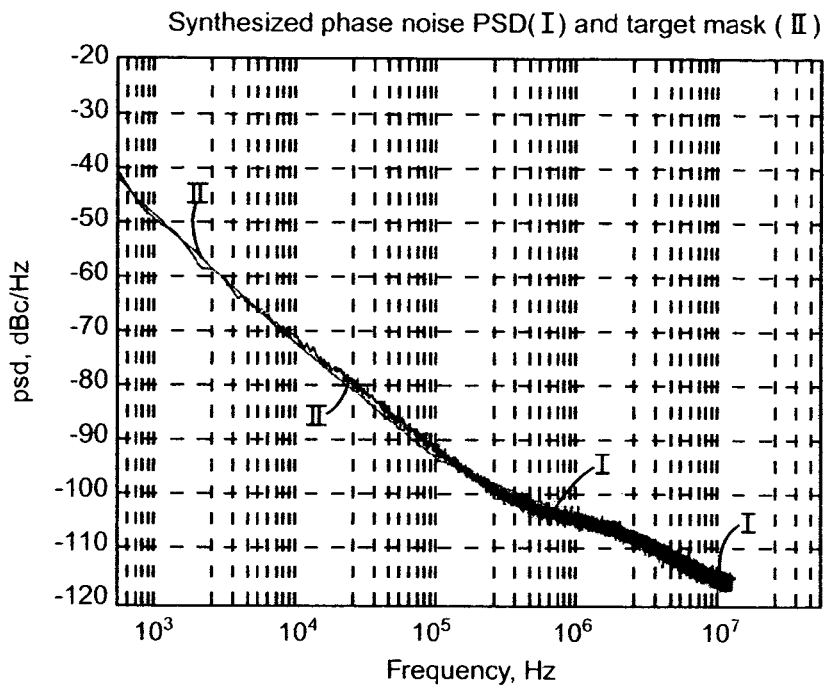
FIG. 7 illustrates a synthetized phase noise PSD compared to the target for 25 Mbaud symbol rate.
Figure 8:
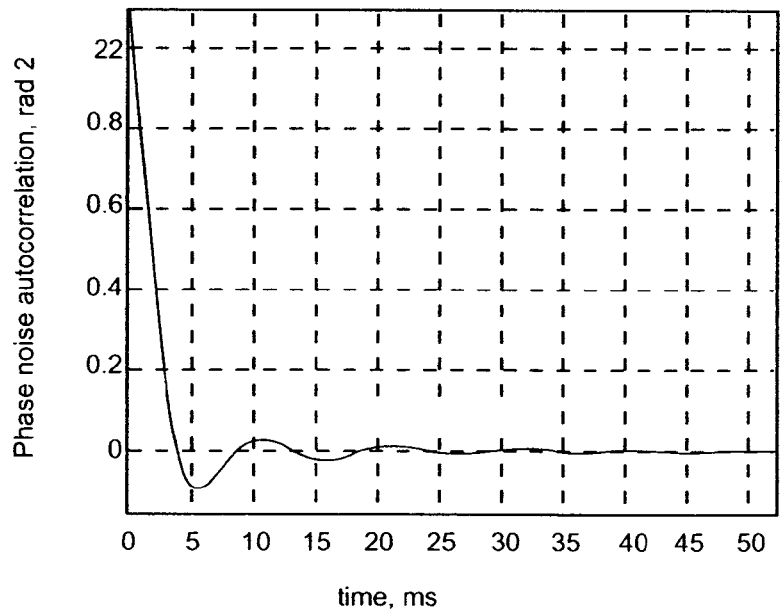
FIG. 8 illustrates the phase noise autocorrelation function for the 25 Mbaud symbol rate case and a frequency step of 6 Hz.

As FIG. 7 shows, there is a fairly good match between the measured PSD of the synthesized phase noise and the target PSD masks.

As it will be clear later, also of interest for the MMSE interpolation algorithm is the autocorrelation function of the phase noise process. This can be computed as an inverse Fast Fourier Transform FFT of the target PSD mask with a suitable frequency spacing and assuming a certain symbol rate. This has been carried out for the 25 Mbaud symbol rate case and using a frequency step of about 6 Hz and the result is plotted in FIG. 8.

The Pilot-Aided techniques that are presented in this paper make use of some phase estimates carried out over the pilot fields. As the symbols transmitted over the pilots are known, it is clear that the best estimator that can be used there is the Maximum Likelihood (ML) estimator (see chap. 5 of the above referenced book by U. MENGALI and A. N. D'ANDREA). Also, as the $L_p$ is usually short, from a few symbols to a few hundreds of symbols, a feedforward (FF) approach is also suggested in order to speed up the required estimation process.

Figure 9:
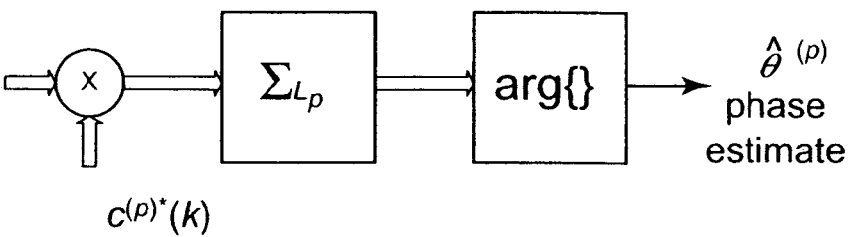
FIG. 9 illustrates a FF ML Phase Estimator.

The block diagram of the Maximum Likehood Feedforward Estimator (FF ML) is represented in FIG. 9 where the variables with superscript "p" indicate that the they refer to the pilot symbols.

The phase estimate is carried out by collecting the $L_p$ matched filter output samples $z^p(k)$ at baud rate corresponding to the pilot fields, and performing the following algebraic operations $$\hat{\theta}^{(p)} = \arg\left\{\sum_{k=0}^{L_p-1} c^{(p)*}(k) Z^{(p)}(k)\right\} \quad (5)$$

$C^{(P)*}(k)$ designates the conjugate of $C^{(P)}(k)$

Signals $C^{(P)}(k)$ are pilot symbols that are an overhead (they do not carry any information content). As is known, the receiver stores the vector of pilot symbols. When a signal sample $Z^P(k)$ corresponding to a pilot symbol arrives, the receiver polls its memory to retrieve pilot symbols $C^{(P)}(k)$, and sample by sample computes equation (5).

Just one estimate is provided every pilot field, so if the carrier phase is actually time variant due to a phase noise or an uncompensated carrier frequency error, the estimate provided will be an average of the phase evolution during the pilot field. However, if $L_p$ is small and the phase process relatively slow, the time variation property of the carrier phase can be neglected. Under this hypothesis and with relatively high signal-to-noise ratio, it can be shown (see chapter 5 of the book by MENGALI and D'ANDREA) that (5) can be re-written as $$\hat{\theta}^{(p)} \cong \theta + N_I \quad (6)$$

θ designating the actual phase value.

with $N_I$ being the zero-mean Gaussian noise contribution to the phase estimate, with variance $$\sigma_{N_I}^2 \cong \sigma_{\hat{\theta}^{(p)}}^2 = \frac{1}{2L_p E_s / N_0} \quad (7)$$

which is independent from the modulation used in the pilot fields.

Also it is worth noting that under the assumption of ideal matched filtering (the noise samples at symbol rate at its output are white), the process consisting of the sequence of noise samples $N_I$ relative to different pilot fields, is white, as no correlation exists between the noise in different pilots.

Figure 10:
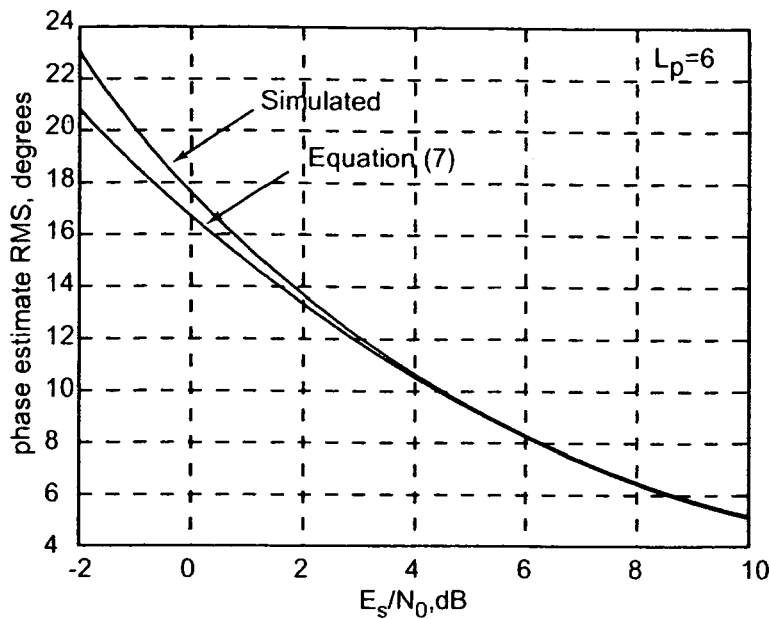
FIG. 10 illustrates a phase estimate RMS of the FF ML synchronizer as a comparison with theory, according to equation (7), and simulation results.

As we pointed out, equation (7) is valid under the assumption of high SNR so that equation (6) holds. For low SNR a departure of the phase estimate variance from (7) is expected, as shown in FIG. 10 where simulation results are compared to (7).

Some of the techniques that are presented here make use of the phase estimates performed over consecutive pilot fields to derive the vector of phase estimates over the data portion of the slot. In these cases, as the FF ML estimator according to equation (5) provides a phase estimate in the interval [−π, π] while the true carrier phase may grow beyond this range over a time slot period, in order to be able to consistently use the pilot-based estimates, an unwrapping technique of the phase estimate has to be applied to these latter. This can follow the approach outlined in the book by U. MENGALI and A. N. D'ANDREA, chapter 5, "5.7.7.—the Unwrapping Problem", p. 284 to 286 and depicted in FIG. 11.

If the index "l" counts the number of pilot-based estimates, the final unwrapped pilot estimates $\hat{\theta}^{(p)}_{(f)}(l)$ are computed from $\hat{\theta}^{(p)}(l)$ as $$\hat{\theta}^{(p)}_{(f)}(l) = \hat{\theta}^{(p)}_{(f)}(l-1) + \alpha SAW[\hat{\theta}^{(p)}(l) - \hat{\theta}^{(p)}_{(f)}(l-1)] \quad (8)$$

where $SAW[\Phi] \equiv [\Phi]_{-\pi}^{+\pi}$ is a sawtooth nonlinearity that reduces Φ to the interval [−π, π) and α is a parameter in the range $0 < \alpha \leq 1$, which in the following we will assume equal to 1.

It is easy to verify that equation (8) provides a good final unwrapped pilot phase estimate, provided the difference between the carrier phase in the current pilot field and the final estimate $\hat{\theta}^{(p)}_{(f)}(l-1)$ on the previous slot is less than π. If that condition is not met, we can think of the feedback algorithm of FIG. 11 as in a cycle slip. This can be the case, for example, when as a result of a residual carrier frequency offset Δv, the carrier phase grows linearly over a slot period (two consecutive pilot fields) of more that π, i.e.

$$2\pi \Delta v L_s T \geq \pi \Rightarrow \Delta v T \geq \frac{1}{2L_s} \quad (9)$$

Equation (9) poses a limit on the maximum value of the residual normalized frequency error that the unwrapping algorithm can cope with without cycle slips. The longer the slot length, the smaller the max sustainable frequency offset.

Note that (9) takes into account the requirement due only to the carrier frequency offset; when thermal noise is also considered, the cycle slip rate may increase. In particular, under the assumption of high SNR, equation (6) indicates that the phase estimates out of the FF ML estimator are Gaussian and independent so that one could compute the probability that a cycle slip occur as $$P_{cs} = Pr\{|\theta^{(p)}(l) - \theta^{(p)}(l-1)| > \pi\} = 2 \int_\pi^\infty \frac{1}{\sqrt{4\pi\sigma_{N_I}^2}} e^{-\frac{x^2}{4\sigma_{N_I}^2}} dx \quad (10)$$

Figure 12:
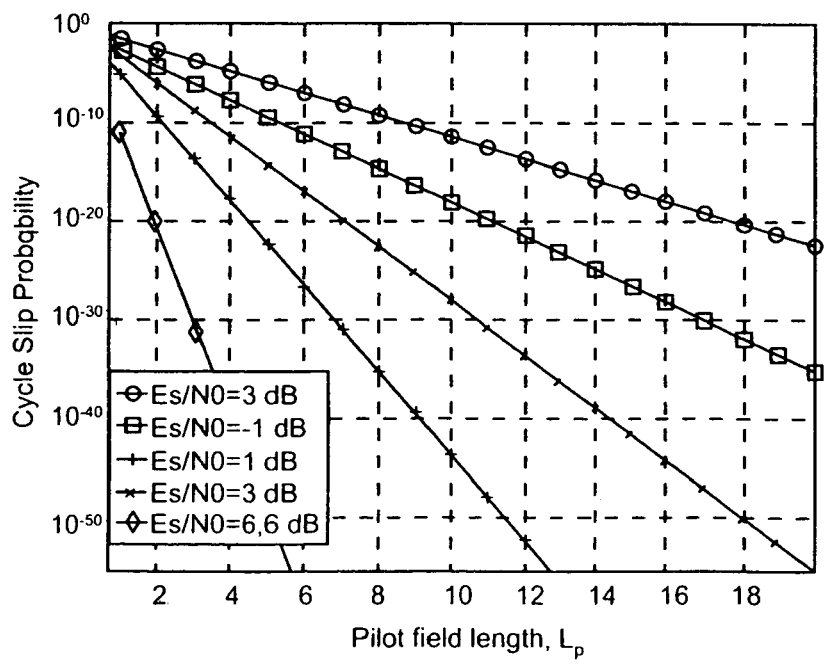
FIG. 12 shows the Cycle Slip Probability of the phase unwrapping algorithm.
Figure 13:
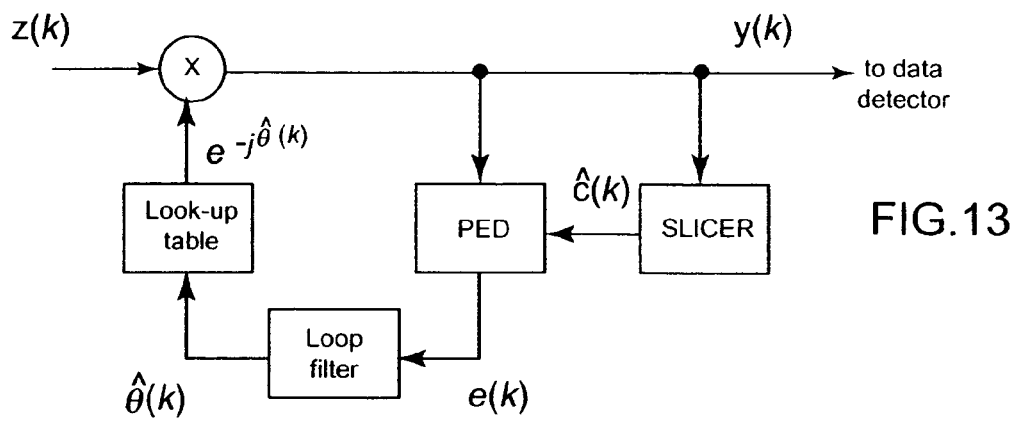
FIG. 13 shows an architecture of a phase recovery unit PRU of a decision-directed digital phase locked loop (DPLL) performing a carrier phase estimation algorithm.

FIG. 12 shows the cycle slip probability $P_{cs}$ as function of the pilot field length as in (10), for different values of the SNR. Note how $P_{cs}$ decreases as $L_p$ and the SNR increase. If one wants to design the system with baud rate $F_s$ in order to have less than 1 cycle slip event per hour of transmission, the probability of cycle slip has to be set to less than $L_s/(3600 F_s)$, which corresponds to the inverse of the number of pilot field-based phase estimates per hour. For example, with $F_s=25\times10^6$ and $L_s=276$, the requirement on $P_{cs}$ results to be $3\times10^{-9}$. From FIG. 12, it turns out that that requirement is met for $L_p>6$ with $E_s/N_0=-3$ dB, $L_p>3$ with $E_s/N_0=-1$ dB, $L_p>2$ with $E_s/N_0=1$ dB and $L_p>1$ with $E_s/N_0=3$ dB.

The cycle slip rate also increases due to the presence of phase noise. However, if the latter is not particularly fast so that the phase variation between two consecutive pilots is negligible with respect to the thermal noise and frequency jitter contribution, its effect can be neglected. This turns out to be the case for the DVB-S2 phase noise model at 25 Mbaud and with reasonably short slots.

The issue of the cycle slip analysis will be adressed later in the paper when the overall system performance will be assessed by means of simulations.

Figure 11:
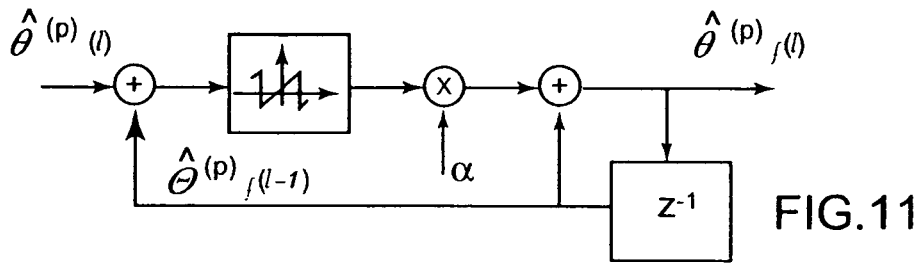
FIG. 11 is a known unwrapping algorithm.

An additional point to make about the cycle slip properties of the unwrapping technique of FIG. 11 is that phase cycle slips occur in multiple of $2\pi$ as it is now shown. To this end let us consider equation (8) that we now re-write by taking into account that i) the sawtooth function introduces a phase jump of a multiple of $2\pi(n2\pi)$ and ii) the phase estimate at the output of the FF ML estimator differs from the true one by a multiple k of $2\pi$ (besides the estimation error):

$$\hat{\theta}^{(p)}{}_j(l) = \hat{\theta}^{(p)}(l-1) + \hat{\theta}^{(p)}(l) - \hat{\theta}^{(p)}(l-1) \pm n2\pi = \hat{\theta}^{(p)}(l) \pm n2\pi = \theta^{(p)}(l) \pm k2\pi \pm n2\pi \quad (11)$$

Then, from (11) one can see that the final un-wrapped estimate always differ from the true one by a multiple of $2\pi$, which means that at least over the pilot fields the phase estimates are always correct. The problem results when interpolating two consecutive phase estimates when a cycle slip has occurred as that would lead to a bad interpolation over the slot comprised between the two pilots.

A family of pilot-aided techniques makes use of a Decision Directed Digital PLL to be used on the data portion of the slot between consecutive pilot-based phase estimates. Then, to start with, we will summarize the fundamentals of such a loop for the modulation formats we are considering.

Firstly, the carrier phase estimation algorithm is based on a digital phase locked loop (DPLL) with "blind" phase error detection with hard decisions (digital DD closed loop phase estimator). FIG. 1 shows the overall architecture of the phase recovery unit (PRU). Signal z(k) is first counter-rotated by an amount equal to the current estimate $\hat{\theta}(k)$ of the actual carrier phase $\theta$, producing y(k). Subsequently, it is sent to a known hard detector (SLICER) so as to provide an estimate $\hat{c}(k)$ of the k-th (coded) transmit symbol. In this respect, we assume to perform slicing according to the transmit constellation for the QPSK and 8PSK and quadrant slicing for 16 QAM and 4+12 APSK. Quadrant slicing is preferred for 16QAM and 16 APSK as easier to implement.

Figure 14:
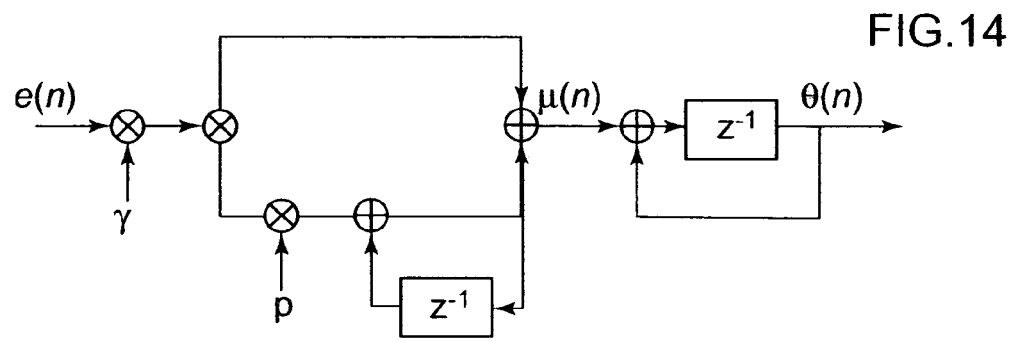
FIG. 14 is a second order loop filter for the DPLL of FIG. 13.

Signals y(k) and $\hat{c}(k)$ (which is obtained form y(k)) are used by the Phase Error Detector (PED) to build-up the error signal e(k)

$$e(k) = Im\{y(k)\hat{c}^*(k)\} \quad (12)$$

which represents the input of the loop filter (c* designates the conjugate of c). In order to cope with a residual frequency offset, we resorted to the second-order loop depicted in FIG. 14. The relevant loop equations are $$\hat{\theta}(k+1) = \hat{\theta}(k) + \mu(k) \quad (13)$$

$$\mu(k+1) = \mu(k) + \gamma(1+\rho)e(k+1) - \gamma e(k) \quad (14)$$

Loop parameters $\rho$ and $\gamma$ can be related to the loop noise bandwidth $B_L$ and to the loop damping factor $\zeta$ as follows $$\zeta = \frac{(1+\rho)\sqrt{\gamma A}}{2\sqrt{\rho}} \quad (15)$$

$$B_L T = \frac{2\rho + \gamma A(2+\rho)}{2[4 - \gamma A(2+\rho)]} \quad (16)$$

where A denotes the S-curve slope at the origin. It is common practice to fix $\zeta$ and $B_L T$ in compliance with the design specifications and then derive the parameters $\rho$ and $\gamma$ through (15)-(16). Assuming (as is always the case) $B_L T \ll 1$, it can be shown that $$\rho \approx \frac{4B_L T}{1+4\zeta^2} \quad \gamma \approx \frac{16\zeta^2 B_L T}{A(1+4\zeta^2)} \quad (17)$$

The phase estimate (13) is input to a Look-up table to provide the counter-rotation factor $\exp(-j\hat{\theta}(k))$ that compensates for the phase error in z(k).

The s-curves of the PED for the different modulation schemes have been computed by means of computer simulations, at $E_s/N_0=\infty$ and at their respective operating points that are mentioned in Table 1.

As with all decision-directed loops, the slicer introduces a phase ambiguity. For example, for 8PSK, a $\pi/4$ ambiguity is present in the phase recovery process. The phase ambiguity is solved with the aid of the pilot-based phase estimates, as it will be clear later on.

As known from an article by de GAUDENZI et al: "Performance Analysis of Decision-Directed Maximum-Likelihood Phase Estimators for M-PSK Modulated Signals", IEEE Transaction on Communications, Vol. 43, no. 12, December, 1995, pages 3090-3100, for DD schemes the S-curve depends on the $E_s/N_0$ value and in particular it tends to flatten as the $E_s/N_0$ decreases, as a result of an increasing number of decoding errors. This is important for the design of the loop bandwidth as the slope of the S-curve at the origin should be determined at the operating $E_s/N_0$ value. For example, for 8PSK the slope turns out to be 0.11 at $E_s/N_0$=6.6 dB (instead of 1 for $E_s/N_0$=∞). That means that without correcting the loop gain, the loop bandwidth at $E_s/N_0$=6.6 dB would be almost two orders of magnitude lower than that without noise.

A number of techniques can be devised which make use of both the pilot estimates and the decision-directed DD DPLL symbol-by-symbol estimates on the data portion of the slot. They all also have in common that they are modulation dependent, in the sense that the DD DPLL structure (in particular the slicer and/or the loop bandwidth value) has to change according to the particular modulation used in the data frame.

A possible technique is to initialize the memory of the DPLL integrator of equation (11) by $\hat{\theta}^{(p)}_f(l)$ of the pilot field prior to the data portion of the slot that is being processed. We will dub this technique with the acronym PA-FL (Pilot-Aided Forward Loop) as the DD loop is helped by the pilot phase estimate and works on the forward data (see FIG. 15). The loop bandwidth value has to be optimally chosen in order to minimize the phase error RMS over the data. As the DPLL may not work entirely in steady state condition during the slot time, a steady state theoretical linear optimization of the loop bandwidth value is not always possible so one may have to resort to simulations to find the optimum.

Figure 15:
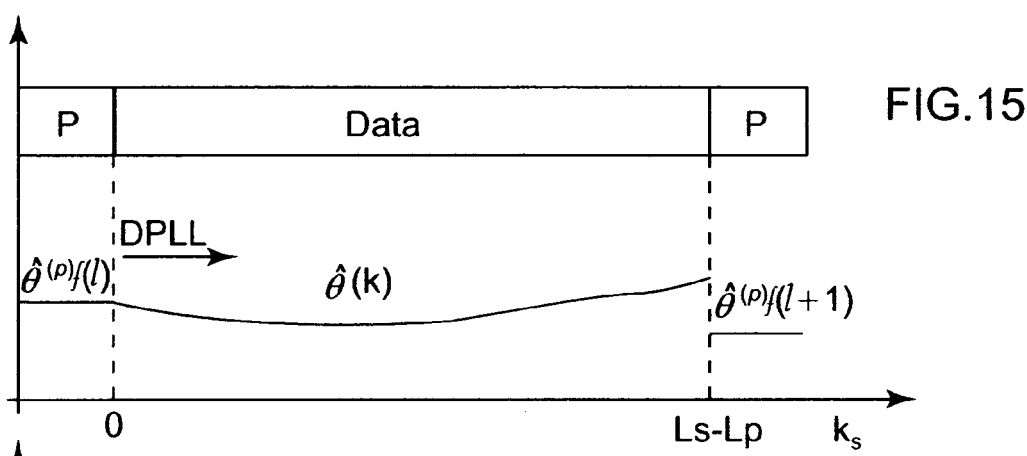
FIG. 15 is a pictorial representation of a technique named Pilot-Aided-Forward loop (PA-FL)

From FIG. 15, it is clear what is the limitation of this approach: the pilot-based estimates are only taken into account as a past estimate by the DPLL, i.e. no prediction based on the next available pilot estimate is exploited. As a result, it is expected that the DPLL estimated phase trajectory tends to depart from the true phase as the point is approaching the end of the slot.

Figure 16:
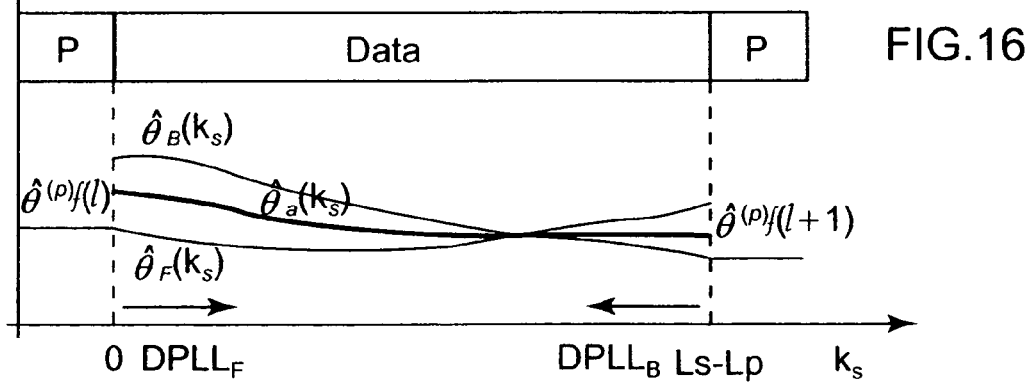
FIG. 16 is a pictorial representation of a PA-FBL and PA-WFBL involving estimate phase trajectories of a forward and a backward loop.

A possible improvement of the PA-FL technique is what we call PA-FBL (Pilot-Aided Forward and Backward Loops) technique, where two identical loops are run on the data: one works on the forward data starting from $\hat{\theta}^{(p)}_f(l)$ (as in the PA-FL technique) while the second works on the backward data starting from $\hat{\theta}^{(p)}_f(l+1)$ of the next pilot. The phase trajectories $\hat{\theta}_F(k_s)$ and $\hat{\theta}_B(k_s)$, each comprised of (Ls–Lp) calculated points ($k_s$ is the symbol index over a generic slot as in FIG. 15) coming from the two DPLLs are then combined to get a final one between the phase trajectories $\hat{\theta}_F(ks)$ and $\hat{\theta}_B(ks)$ (see FIG. 16). The combination can be a simple arithmetic average:

$$\hat{\theta}_a(ks) = A\hat{\theta}_F(ks) + B\hat{\theta}_B(ks)$$

where A+B=1 and A and B are constant and different from 0 or a weighted average (in this case we dub the technique PA-WFBL) which means that A and B depend on the value of ks. In the PA-WFBL approach, the average is preferably performed by giving more weight to the DPLL estimate which is closer to its original starting pilot-based estimate, the rational being that the farther from the ML pilot-based estimate, the less reliable the DPLL phase trajectory. In the preferred embodiment, the average $\hat{\theta}_a(k)$ is carried out as:

$$\hat{\theta}_a(k_s) = \left(1 - \frac{k_s}{(L_s - L_p)}\right)\hat{\theta}_F(k_s) + \left(\frac{k_s}{(L_s - L_p)}\right)\hat{\theta}_B(k_s) \quad (18)$$

where $\hat{\theta}_F(k_F)$ and $\hat{\theta}_B(k_F)$ are the estimated phase trajectories of the forward and backward loops respectively. Note that ks=0 corresponds to the pilot field.

Figure 17:
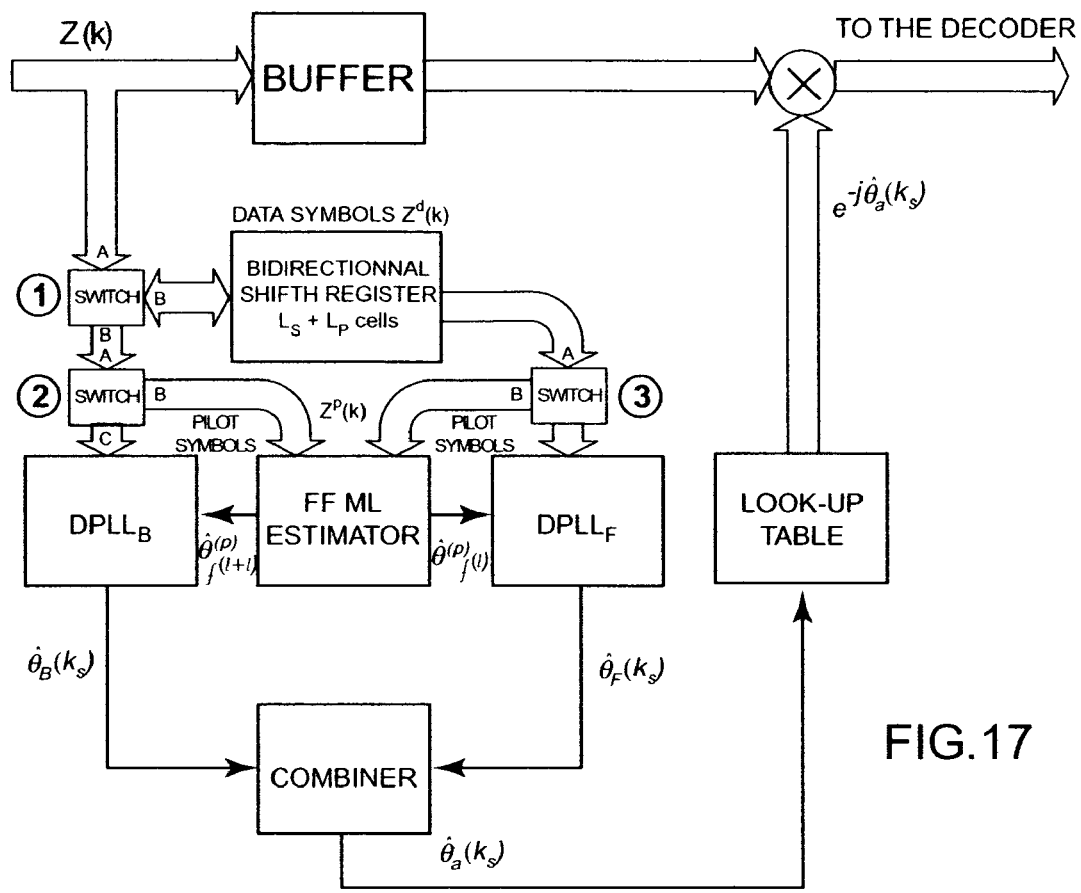
FIG. 17 is a block diagram of a system implementing the PA-FBL or PA-WFBL technique.

FIG. 17 shows a possible implementation of the PA-FBL and PA-WFBL techniques. The samples at symbol rate at the output of the matched filter are sent to the carrier phase recovery unit that processes a vector of $L_s+L_p$ samples (the current slot plus the next pilot field of the next slot). These samples are written to a bi-directional read and write shift register through the switch 1 that during this phase connects its ports A and B. In the next phase, the content of the shift register is read from two outputs to switch 1 and 3. As the output to switch 1 is read, the samples come out in the reverse order with respect the order with which they were written. No data flipping takes place instead for the samples sent to switch 3. At this time the switch 1 connects its ports B and C so that the samples can be further processed by the phase recovery units further down in the block diagram. As the first samples coming out of the shift register correspond to pilot symbols, the switches 2 and 3, by connecting their ports A and B, make sure that they are delivered to the FF ML estimator unit. From the switch 2 the samples are relative to the pilot field of the next slot, while the ones from switch 3 pertain to the pilot symbols of the current slot. Based on these two pilot fields, the FF ML estimator produces two phase estimates, $\hat{\theta}^{(p)}_f(l)$ and $\hat{\theta}^{(p)}_f(l+1)$ according to equations (5) and (8), which are then used by the two DPLL's (DPLL$_B$ and DPLL$_F$) to initialize their integrators of equation (13). Once $L_p$ samples are read from the shift register and delivered to the FF ML estimator, the switches 2 and 3 change states by connecting ports A and C as the samples coming out from the shift register correspond now to the data symbols and hence they have to be processed by the two DPLL's. As the samples arrive to the DPLL's the two phase estimates $\hat{\theta}_F(k_s)$ and $\hat{\theta}_B(k_s)$ are computed in real time and then combined by the combiner block. This latter computes $\hat{\theta}_a(k)$ through a simple arithmetic average (for the PA-FBL technique) or through a weighted average such as in equation (18) (for the PA-WFBL technique). Finally, a look-up table is used to compute the phasor used to de-rotate the signal samples. These latter were stored in a buffer waiting for the first sample of the phasor to be ready. The whole set of mentioned operations are repeated for the next slot.

Figure 18:
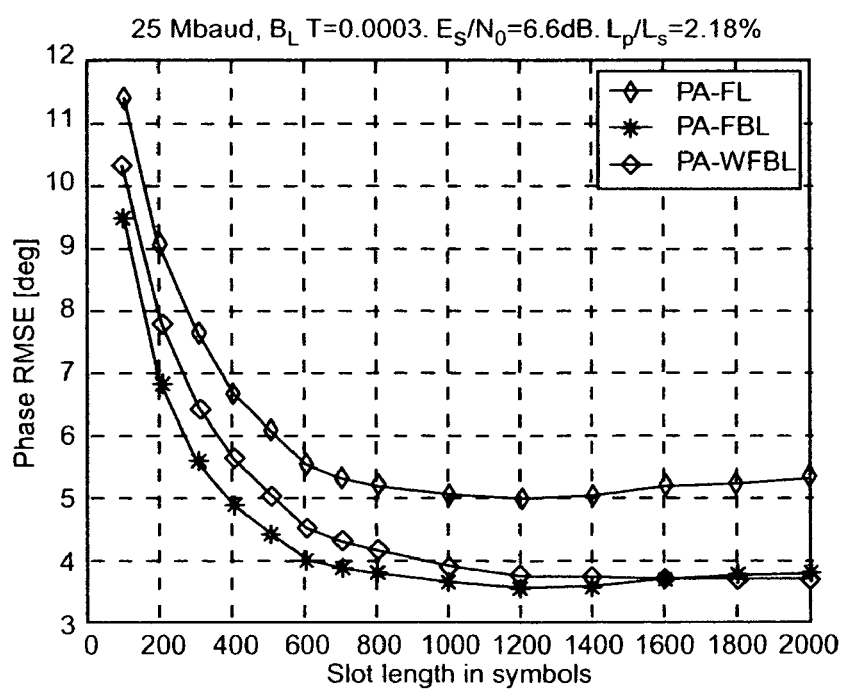
FIGS. 18 and 19 show the jitter RMS performance of the PA-FL, PA-FBL and PA-WFBL algorithms at respectively $E_s/N_o=6.6$ dB (for 8PSK), and $E_s/N_o=1$ dB (for QPSK)
Figure 19:
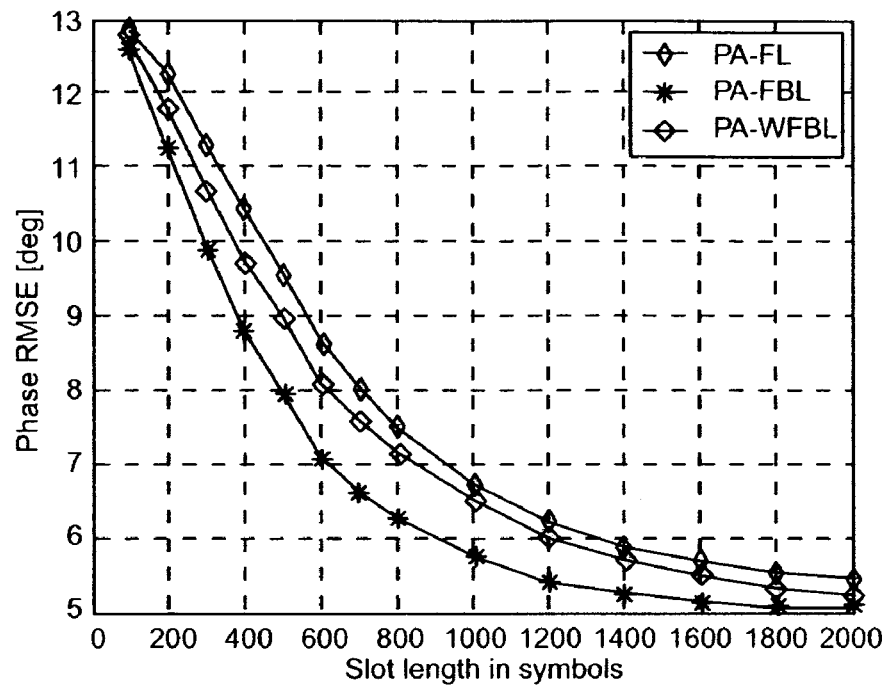

FIGS. 18 and 19 show the jitter performance of the presented schemes for different values of the SNR. As seen, the performance starts to be reasonably good only at very long slot sizes (greater than 1000 symbols). This implies a relatively sensitivity to carrier frequency errors.

Figure 20:
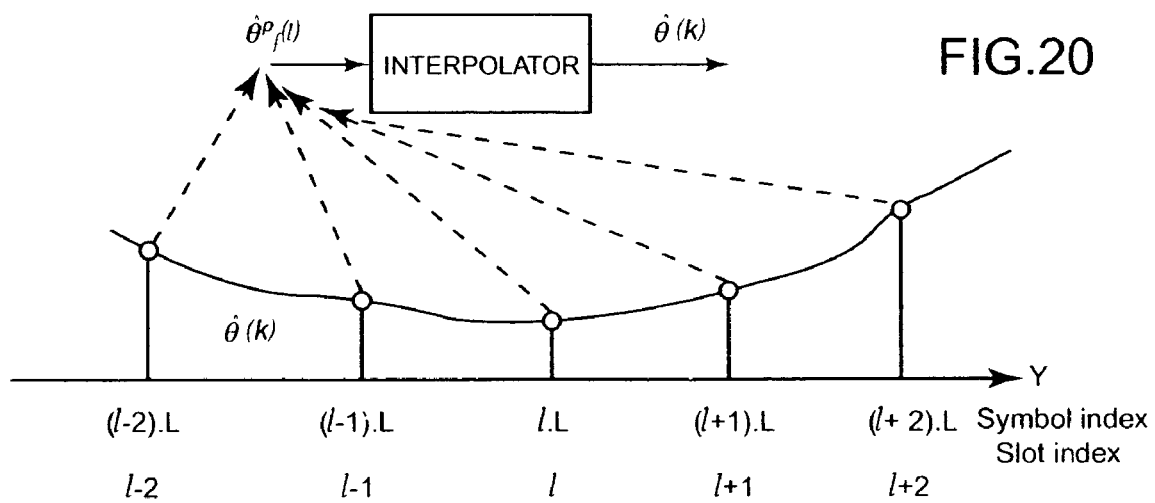

Another class of techniques are data modulation independent, as the FF ML estimates performed over the pilot fields are used as basepoints of a phase interpolation process. The phase estimates of the data are then samples of the interpolation function and thus do not make use of any information about the transmit symbols. This technique is described in FIG. 20.

Note that in the figure above the basepoints (the pilot based estimates) are assumed to correspond to just one symbol interval and the interpolants are computed for each of the symbols corresponding to a slot, i.e. including the $L_p$ pilot symbols. In reality, the pilot-based estimates refer to a $L_p$ samples, and the interpolants do not need to be computed over this set of samples. However, in order to properly set the mathematical framework of the technique, we will assume that the pilot-based FF ML phase estimates corresponds to an estimate of the carrier phase at the symbol time of the last symbol of the pilot field, and the interpolants are computed for all the symbols of the basepoint period $L_s$ (even though the last $L_p$ estimates are then discarded). This approximation holds for short length of the pilot fields, that is much shorter than the time constant of the carrier phase process. Some performance degradations are expected when the dynamics of the carrier phase as such that θ(k) cannot be approximated as constant during the pilot fields.

In addition, in order to simplify the notation, from now on we will use the following identity when indicating pilot based estimates $$\hat{\theta}(l \cdot L_s) \equiv \hat{\theta}^{(p)}_f(l)$$

which simply states that the FF ML pilot-based estimates are just samples of the overall estimated phase trajectory at multiple of the slot length.

Figure 21:
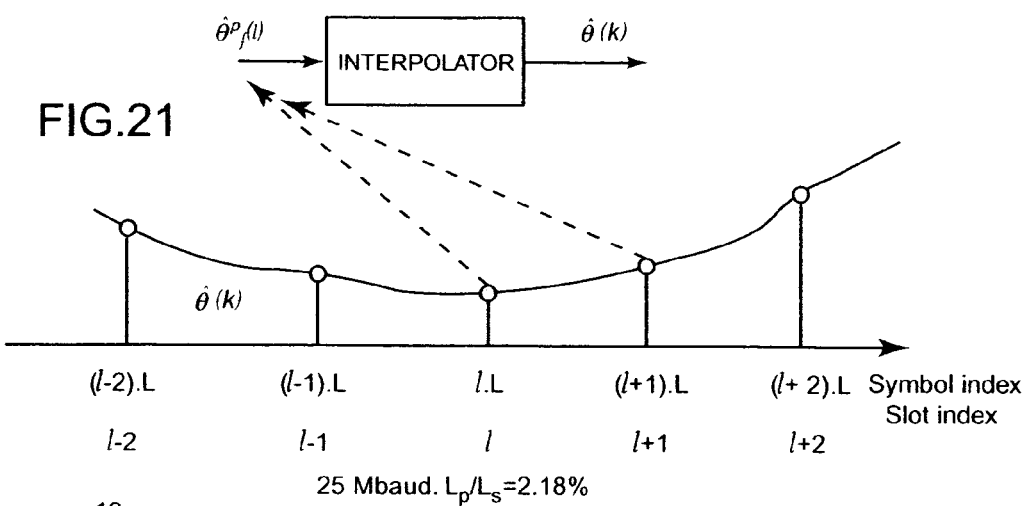
FIG. 21 illustrates a linear interpolation technique making use only of the pilot fields.

The simplest interpolation technique that one can think of is the linear interpolation between two consecutive pilot estimates. This technique, which it will be dubbed PA-LI is illustrated in FIG. 21. In order to compute the interpolants for the current ($\bar{l}$-th) slot, the interpolator makes use of only the FF ML estimate of the pilot fields of the l-th slot and the one of the next slot (($\bar{l}$+1)-th slot) according to the following equation $$\hat{\theta}(k_s) = \hat{\theta}(\bar{l} \cdot L_s) + [\hat{\theta}((\bar{l}+1) \cdot L_s) - \hat{\theta}(\bar{l} \cdot L_s)]\left(\frac{k_s}{L_s}\right), \quad (19)$$

$$k_s = 1, 2, \ldots, L_s - 1$$

A further step would be to consider an interpolation technique where the interpolants in a given slot are computed with a higher order interpolation function, i.e. parabolic or cubic. However, instead of taking this route when deriving higher order interpolators, in the next section we will investigate on a MMSE (Minimum Mean Square Error) technique, which will allow us to derive an "optimum" interpolator.

Figure 22:
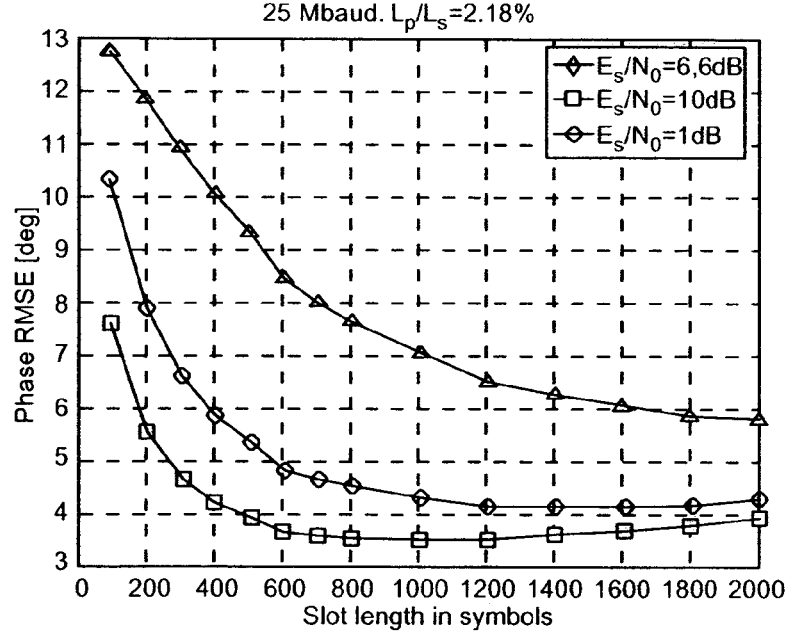
FIG. 22 illustrates the jitter RMS performance of the Linear Interpolation Technique for different Es/No values.

FIG. 22 shows the jitter performance of the algorithm for different SNR values. As see the performance are not satisfactory for that pilot overhead as target jitter performance of Table 2 are all failed.

The best interpolation technique (in the sense of minimum average error power) is based on a MMSE (Minimum Mean Square Error) technique. This kind of interpolation technique has already been used for flat fading channels [5] to cope with fast varying fading processes. However, in that work the interpolation was performed on the complex phasor representing the fading process and the pilot-based estimation were merely one-symbol worth-samples where the modulation symbol was removed. Here we modify that approach to the interpolation of the phase noise where the pilot-based estimates are performed as in section 5 over $L_p$ symbols with the FF ML phase estimation algorithm. In the following we describe the mathematical framework that leads to the derivation of the algorithm.

We will start by examining equation (6) that we re-write here by adding the symbol index and dropping the subscript "p" (implicitly, the phase estimates taken at multiple of the slot period are from the pilots)

$$\hat{\theta}(l \cdot L_s) \cong \theta(l \cdot L_s) + N_f(l \cdot L_s) \quad (20)$$

It goes without saying that the estimates from the FF ML estimators are supposed to be post-processed by the unwrapping algorithm of FIG. 11. However, in order to simplify the notation, we drop the superscript "f".

What we want to derive is a set of filters with coefficients $\gamma_{k_s}(m)$ (one filter for each symbol time in the slot) such that the phase interpolants over the slot $$\hat{\theta}(l \cdot L_s + k_s) = \sum_{m=-M}^{M} \gamma_{k_s}(m)\hat{\theta}[(l+m) \cdot L_s] \quad (21)$$

are optimum in the sense that they minimize the mean square error $$J(k_s) = E\left\{\left[\theta(l \cdot L_s + k_s) - \sum_{m=-M}^{M} \gamma_{k_s}(m)\hat{\theta}[(l+m) \cdot L_s]\right]^2\right\} \quad (22)$$

Application of the orthogonality principle yields the optimum coefficients as the solution to the set of equations $$E\left\{\left[\theta(l \cdot L_s + k_s) - \sum_{m=-M}^{M} \gamma_{k_s}(m)\hat{\theta}[(l+m) \cdot L_s]\right]\hat{\theta}[(l+p) \cdot L_s]\right\} = 0, \quad (23)$$

$$p = 0, \pm 1, \ldots, \pm M$$

for $k_s = 0, 1, \ldots, L_s - 1$.

Equation (23) can be put in a more suitable form by introducing the autocorrelation of $\hat{\theta}(l \cdot L_s)$ $$R_{\hat{\theta}\hat{\theta}}(pL_s) \equiv E\{\hat{\theta}[(l+p) \cdot L_s]\hat{\theta}[l \cdot L_s]\} \quad (24)$$

and the cross-correlation of $\theta(l \cdot L_s)$ and $\hat{\theta}(l \cdot L_s)$ $$R_{\theta\hat{\theta}}(pL_s) \equiv E\{\theta[(l+p) \cdot L_s]\hat{\theta}[l \cdot L_s]\} \quad (25)$$

Then, (23) becomes $$\sum_{m=-M}^{M} \gamma_{k_s}(m)R_{\hat{\theta}\hat{\theta}}(mL_s - pL_s) = R_{\theta\hat{\theta}}(k_s - pL_s), \quad (26)$$

$$p = 0, \pm 1, \ldots, \pm M, k_s = 0, 1, \ldots, L_s - 1$$

These equations are the so-called Wiener-Hopf equations, which can also be put in a matrix form as $$R_{\hat{\theta}\hat{\theta}}\gamma_{k_s} = r_{\theta\hat{\theta}k_s}, k_s = 0, 1, \ldots, L_s - 1 \quad (27)$$

where $$r_{\theta\hat{\theta}k_s} \equiv [R_{\theta\hat{\theta}}(k_s + ML_s), R_{\theta\hat{\theta}}(k_s + (M-1)L_s), \ldots, R_{\theta\hat{\theta}}(k_s), \ldots, R_{\theta\hat{\theta}}(k_s - ML_s)]^T \quad (28)$$

$$\gamma_{k_s} \equiv [\gamma_{k_s}(-M), \gamma_{k_s}(-M+1), \ldots, \gamma_{k_s}(0), \ldots, \gamma_{k_s}(M)]^T$$

and (29)

-continued $$R_{\hat{\theta}\hat{\theta}} \equiv \begin{bmatrix} R_{\hat{\theta}\hat{\theta}}(-ML_s + ML_s) & R_{\hat{\theta}\hat{\theta}}((-M+1)L_s + ML_s) & \cdots & R_{\hat{\theta}\hat{\theta}}(ML_s + ML_s) \\ R_{\hat{\theta}\hat{\theta}}(-ML_s + (M-1)L_s) & R_{\hat{\theta}\hat{\theta}}((-M+1)L_s + (M-1)L_s) & \cdots & R_{\hat{\theta}\hat{\theta}}(ML_s + (M-1)L_s) \\ \cdots & \cdots & \cdots & \cdots \\ R_{\hat{\theta}\hat{\theta}}(-ML_s - ML_s) & R_{\hat{\theta}\hat{\theta}}((-M+1)L_s - ML_s) & \cdots & R_{\hat{\theta}\hat{\theta}}(ML_s - ML_s) \end{bmatrix}$$

$$= \begin{bmatrix} R_{\hat{\theta}\hat{\theta}}(0) & R_{\hat{\theta}\hat{\theta}}(L_s) & \cdots & R_{\hat{\theta}\hat{\theta}}(2ML_s) \\ R_{\hat{\theta}\hat{\theta}}(L_s) & R_{\hat{\theta}\hat{\theta}}(0) & \cdots & R_{\hat{\theta}\hat{\theta}}(2ML_s - 1) \\ \cdots & \cdots & \cdots & \cdots \\ R_{\hat{\theta}\hat{\theta}}(2ML_s) & R_{\hat{\theta}\hat{\theta}}(2ML_s - 1) & \cdots & R_{\hat{\theta}\hat{\theta}}(0) \end{bmatrix} \quad (30)$$

Now, from (20) it is seen that the correlation functions (24) and (25) can also be put in the following forms $$R_{\hat{\theta}\hat{\theta}}(pL_s) \equiv R_{\theta\theta}(pL) + \frac{1}{2L_p E_s/N_0} \delta(p) \quad (31)$$

$$R_{\hat{\theta}\theta}(pL_s) = R_{\theta\theta}(pL_s) \quad (32)$$

hence, the matrix formulation (27) can be re-written as $$\left[ R_{\theta\theta} + \frac{1}{2L_p E_s/N_0} I \right] \gamma_{k_s} = r_{\theta\theta k_s}, k_s = 0, 1, \ldots, L_s - 1 \quad (33)$$

where the definitions of $R_{\theta\theta}$ and $r_{\theta\theta k_s}$ can easily be derived from (28) and (30). Equation (33) can be readily solved by a matrix inversion for every $k_s = 0, 1, 2, \ldots, L_s - 1$, i.e.

$$\gamma_{k_s} = \left[ R_{\theta\theta} + \frac{1}{2L_p E_s/N_0} I \right]^{-1} r_{\theta\theta k_s}, k_s = 0, 1, \ldots, L_s - 1 \quad (34)$$

Equation (34) indicates that the taps of the Wiener filter depend on the autocorrelation function of the carrier phase and on the signal-to-noise ratio. As these are generally not know a priori, either they are estimated or they are assumed to be set to a fixed worst case. We will return to these arguments later in the section. Now, we want to derive an expression of the minimum mean square error resulting from the interpolation of the Wiener filter with taps (34). To this end, we re-write (22) in a matrix form, compute the expectations and use the orthogonality principle (23) to get $$J(k_s) = R_{\theta\theta}(0) - r_{\theta\theta k_s}^T \gamma_{k_s} = R_{\theta\theta}(0) - r_{\theta\theta k_s}^T \left[ R_{\theta\theta} + \frac{1}{2L_p E_s/N_0} I \right]^{-1} r_{\theta\theta k_s}, \quad (35)$$

$$k_s = 0, 1, \ldots, L_s - 1$$

The average of the mean square error $J(k_s)$ over the slot, i.e. $\bar{J}$, can also be computed as $$\bar{J} = \frac{1}{L_s} \sum_{k_s=0}^{L_s-1} J(k_s) \quad (36)$$

Figure 23:
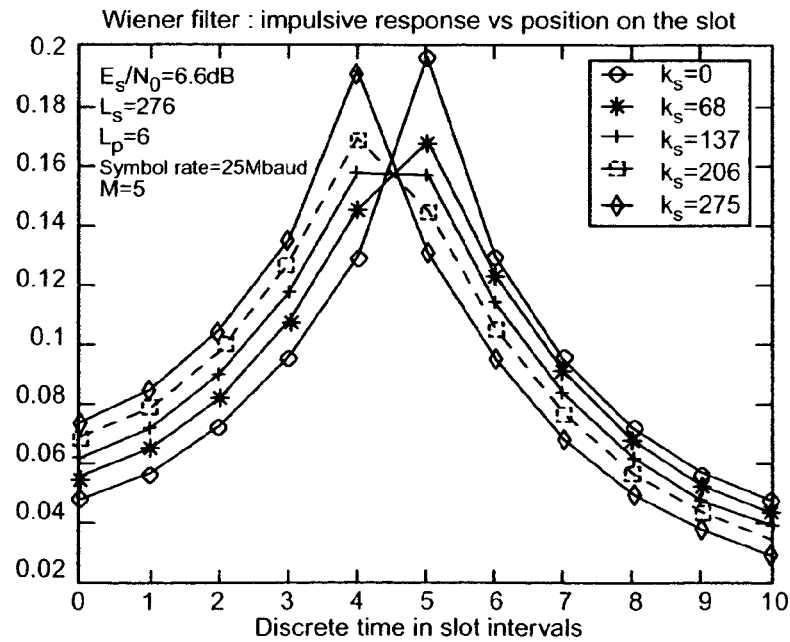
FIGS. 23 and 24 show respectively the impulse response and the Amplitude/Frequency response of a Wiener filter for different slot positions.
Figure 24:
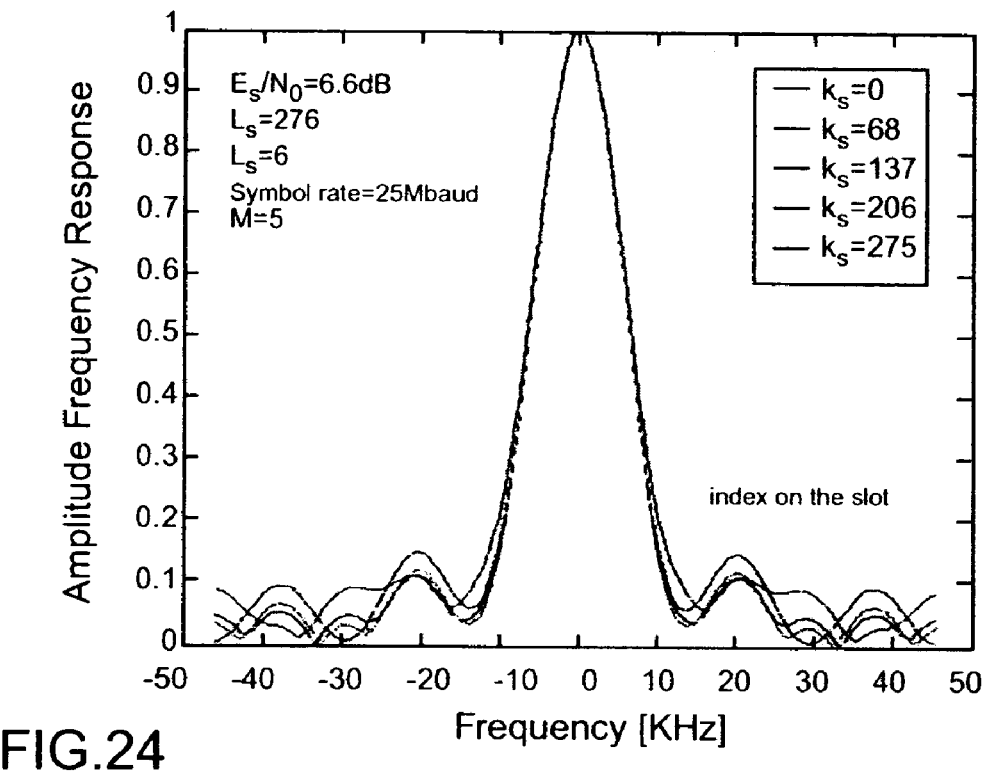

FIG. 23 and FIG. 24 show the impulse and frequency (amplitude) response of the Wiener interpolator for different positions over the slot ($k_s$)

Figure 25:
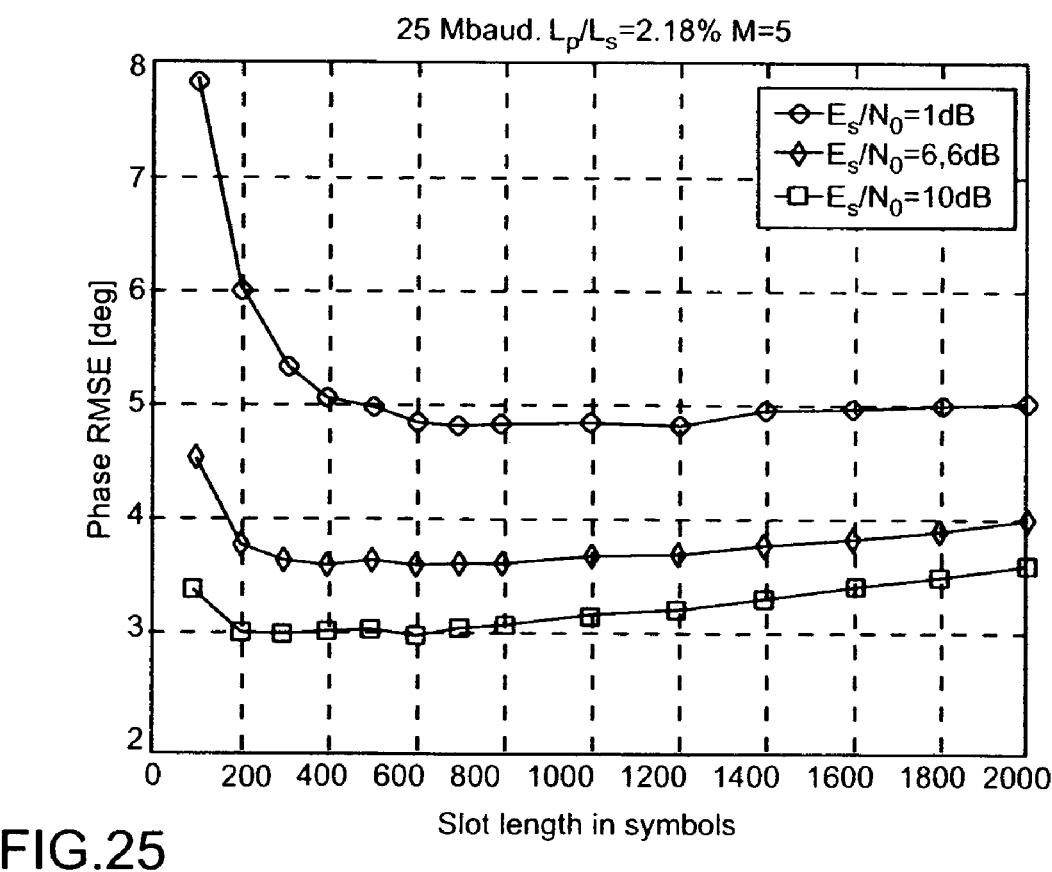
FIG. 25 shows the phase root mean square error RMSE for the Wiener filter interpolation technique for different slot lengths.

FIG. 25 shows the root mean square error (square root of (36)) as function of the slot length for an overhead of 2.23%, 25 Mbaud symbol rate and M=5, for different values of the SNR (corresponding to the lowest operating SNR for QPSK, 8PSK and 16QAM/4+12APSK).

In the figure the overhead is kept constant so that when the slot length increases, the pilot field length grows as well. This explain the shape of the curves of FIG. 25: for very short slots, the pilot field is also very short so the FF ML estimates result to be very unprecise thus affecting the overall RMSE. On the other end, for long slots, the phase noise samples over the (2M+1) slots used by the interpolator, tend to become less correlated thus reducing the benefits of the interpolation.

Figure 26:
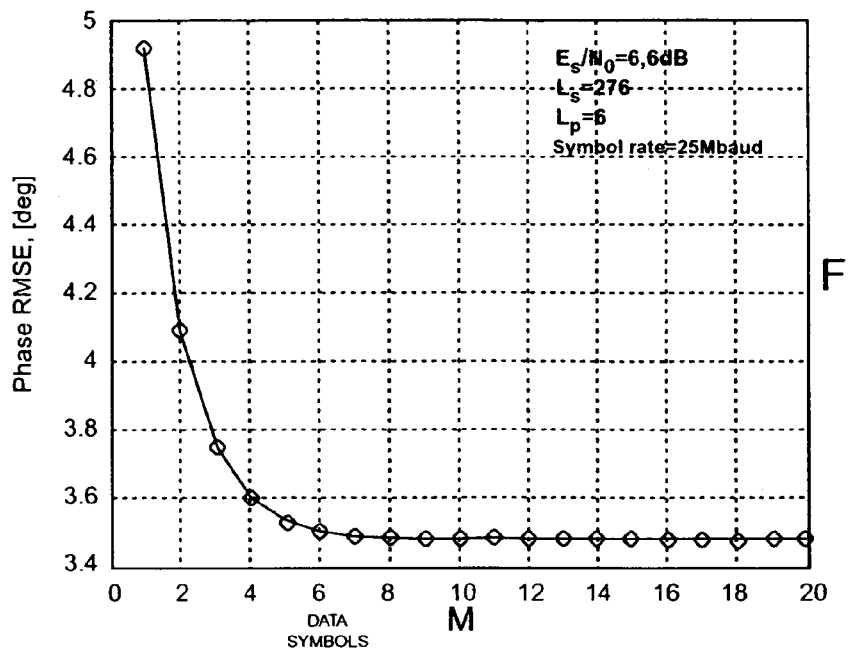
FIG. 26 shows the dependence of the phase RMSE for the Wiener interpolation technique for different values of M, M designating the number of taps of the Wiener interpolator.

FIG. 26 shows the dependence of the phase RMSE to the number of taps of the Wiener filter (2M+1). As seen, the RMSE decreases as M increaseas up until a point where the phase noise is not correlated anymore so the additional basepoints do not bring advantages to the interpolation process.

Figure 27:
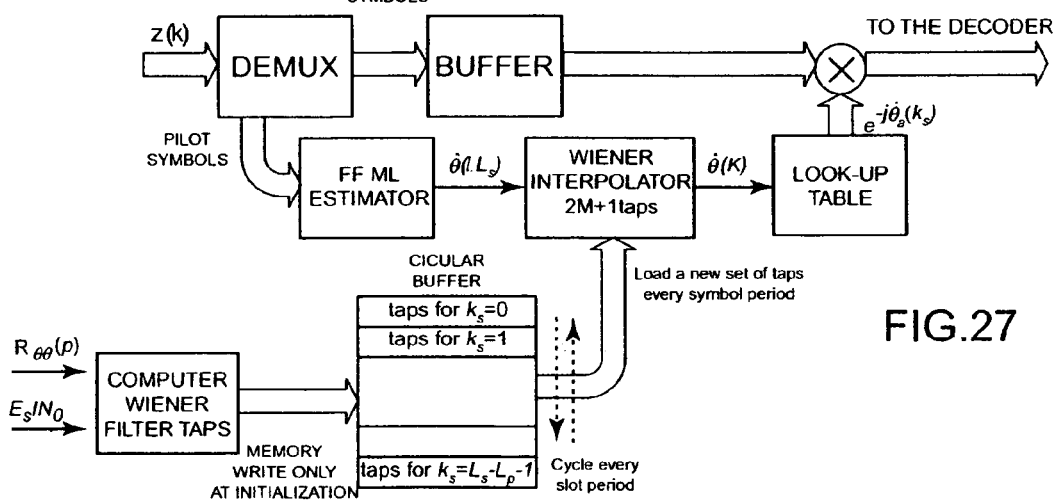
FIG. 27 is a block diagram of a system implementing the Wiener interpolation technique (PA-WI)

A possible implementation of the Wiener interpolation technique (that will be dubbed PA-WI from now on) is depicted in FIG. 27.

The block diagram shown in the figure is self-explanatory. The only two notes worth mentioning are: 1) The coefficients of the Wiener filter need to be computed just once at the system initialization; 2) the Wiener filter taps do not need to be computed for every slot position as the last $L_p$ symbols are actually pilot symbols, hence they do not need to be de-rotated for decoding. That is the reason why the circular buffer of FIG. 27 only contains $L_s - L_p$ vectors of taps.

We shall now point out a number of practical implementation issues concerned with the MMSE interpolation techniques and propose the relative solutions.

So far we have assumed to know both the autocorrelation function of the phase noise process and the signal-to-noise ratio $E_s/N_0$. This hypothesis is in general not realistic as these two quantities are usually not perfectly known a priori.

The phase noise mask of FIG. 4 is only an indication of the worst case PSD of the phase noise in the system, in the sense that the PSD of the true phase noise is guaranteed to be below that mask for the whole frequency range of interest. The exact shape is however unknown, even though it certainly resembles a low pass frequency function as the one of the mask. So two approaches can be followed here: I) the worst case PSD of the phase noise process and the nominal SNR operating point are considered when computing the Wiener filter coefficients or ii) the autocorrelation function of the phase noise as well as the SNR are estimated at system initialization. The first approach is certainly the simplest as it usually guarantees good performance since the error due to the mismatch between the true phase noise PSD and the worst case mask is usually compensated by the lower power of the true phase noise. Thus this is the approach that we recommend.

The second technique includes a phase noise autocorrelation estimate over the pilot fields as it follows: first an estimate of the autocorrelation $R_{\hat{\theta}\hat{\theta}}(pL_s)$ of the phase estimates $\hat{\theta}(lL_s)$ is carried out by performing time domain cross-correlation products over a vector of N pilot-based phase estimates as in the following equation $$\hat{R}_{\hat{\theta}\hat{\theta}}(pL_s) = \frac{1}{N-p} \sum_{l=0}^{N-1} \hat{\theta}(lL_s)\hat{\theta}((l+p)L_s) \tag{37}$$

Second, an estimate of the SNR is carried out by estimating the power of the signal samples at the matched filter output (2), which, assuming perfect AGC operations, is equivalent to $C_2 + C_2/(E_s/N_0)$. As $C_2$ (the signal constellation power) is known, the SNR is readily computed; iii) finally an estimate of the phase noise autocorrelation function $\hat{R}_{\theta\theta}(pL_s)$ at lags of multiple of the slot interval, are computed by resorting to equation (31) and using the estimates performed in steps i) and ii). The autocorrelation values for lags not multiple of the slot period can then be retrieved by performing a linear interpolation between adjacent estimates $\hat{R}_{\theta\theta}(pL_s)$. To be remarked that this techniques also provide as a byproduct, an estimate of the SNR.

The Wiener filter theory illustrated here assumes that the entire carrier phase is characterized by only the phase noise process. In reality, a residual carrier frequency error exists as well as a constant phase uncertainty due to the channel distortion. The presence of these two quantities cause the overall carrier phase to be completely unknown so that an unbiased phase estimator is required.

If we turn our attention to equation (21), where we assume a constant carrier phase at least over the filter memory, the Wiener filter mean estimate is easily computed to be $$E\{\hat{\theta}(lL_s + k_s)\} = \theta \sum_{m=-M}^{M} \gamma_{k_s}(m) \tag{38}$$

which in general has then a bias, since it is not guaranteed that the sum of the Wiener filter taps is one. If, however, we impose this condition, we can then guarantee an unbiased estimate. That can be done by scaling the Wiener filter taps obtained by equation (34) by the ratio $$1 / \sum_{m=-M}^{M} \gamma_{k_s}(m).$$

Figure 28:
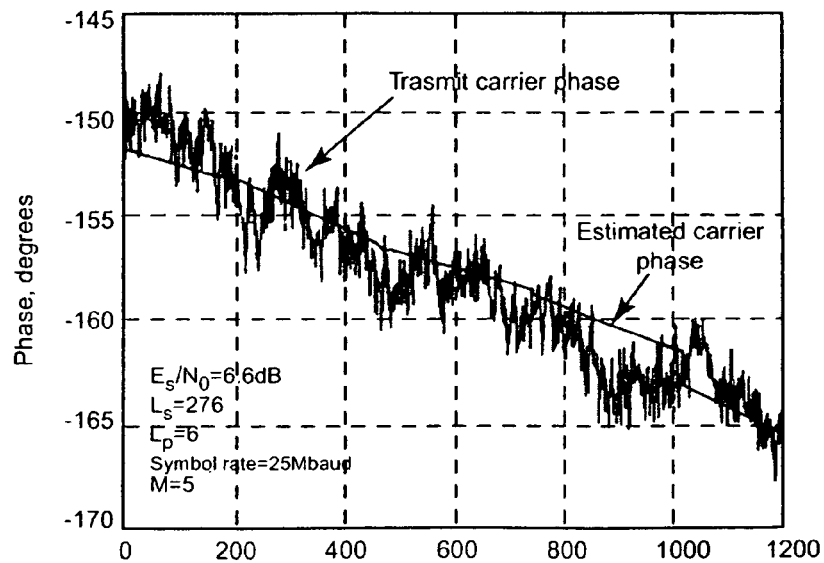
FIG. 28 illustrates a time domain Wiener filter interpolation over 1200 transmit symbols.
Figure 29:
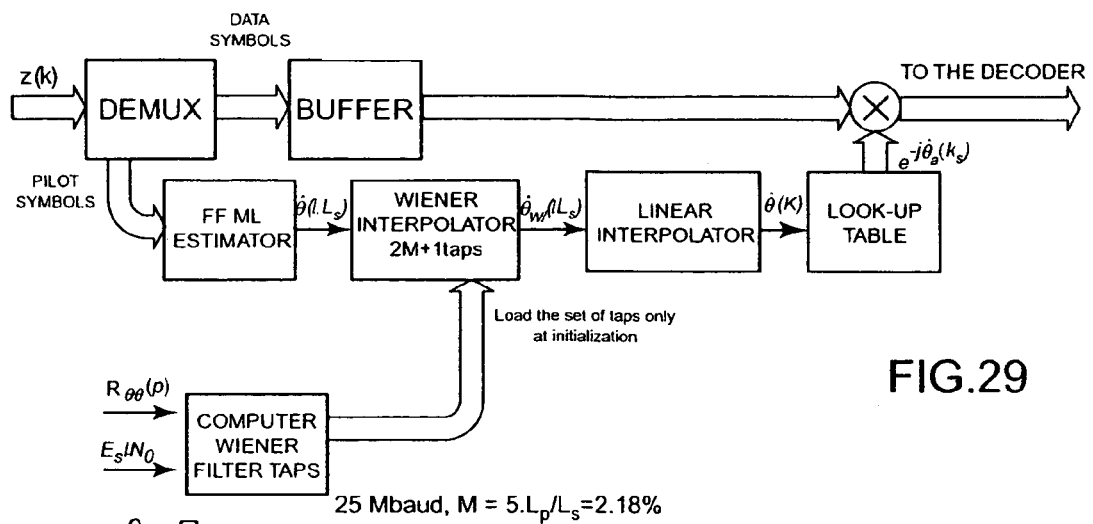
FIG. 29 is a block diagram of a simplified Wiener interpolation technique (PA-SWI) suitable to implement the invention.
Figure 30:
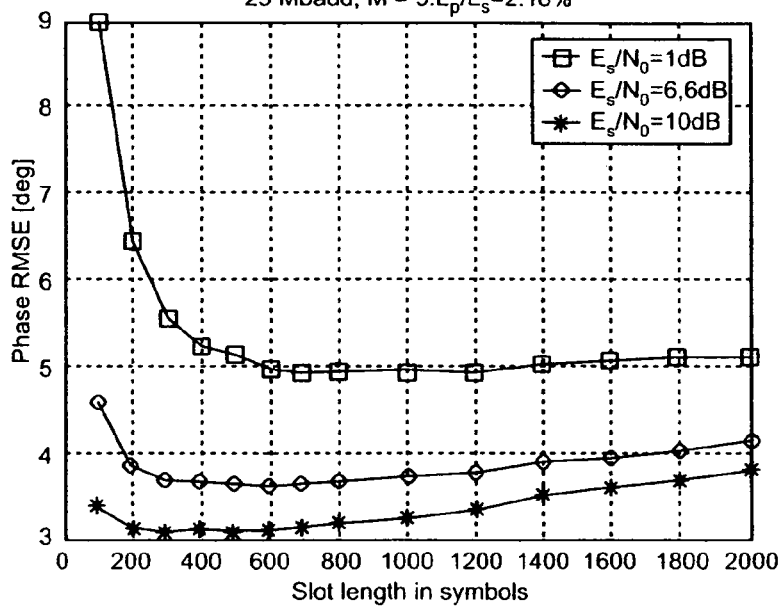
FIGS. 30 and 31 illustrate the phase RMSE for the PA-SWI technique as a function of various signal/noise ratios Es/No for different slot lengths (FIG. 31) and for different pilot overheads of length Lp.

The Wiener filter interpolation technique has a quite complex structure as it needs $L_s-L_p$ interpolating filters, each with 2M+1 taps. A question then arises on whether a simplification is possible without with a minor impact on performance. The answer comes by examining the estimated phase trajectory at the Wiener filter's output as depicted in FIG. 28, where a 276 slot length with 6 pilot symbols are used. As seen, the phase trajectory over the data field of the slot seems almost linear, thus suggesting that a linear interpolation approach is almost optimal for at least reasonably short slot lengths. The idea is then to perform Wiener filter interpolation only for $k_s=0$ (on the pilots) and draw a linear interpolation between pilot-based estimates. The resulting block diagram of the system implementing the simplified version of the Wiener filter interpolation (PA-SWI) is shown in FIG. 29. Simulations have been run to assess the performance of the PA-SWI technique with the DVB-S2 system parameters and the results are shown in FIG. 30. When compared with FIG. 25 one can verify that the performance degradations are really small for the whole set of examined slot lengths.

Figure 31:
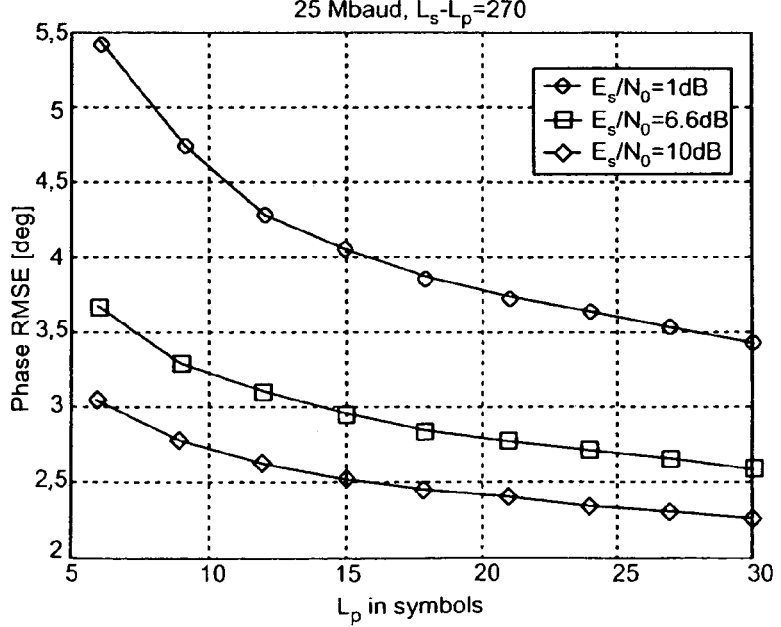

FIG. 31 shows the RMS phase jitter of the PA-SWI technique for a fixed slot data length of 270 symbols and different values of the SNR and pilot field length. As seen, the QPSK and 8PSK target jitter RMS can be reached for $L_p=6$ while it appears that for 4+12 APSK a longer overhead may be needed.

So far the assumption has been made that no carrier frequency error is present, i.e. in other words we have assumed a perfect carrier frequency recovery. As this is not a realistic assumption and considering that the performance of the carrier phase recovery is highly dependent on a good carrier frequency recovery, in this section we propose to investigate the issue of carrier frequency recovery suitable for the pilot-aided algorithms presented in this paper. First, though, we start by assessing the sensitivity of the presented carrier phase recovery schemes on fixed frequency errors.

Since it is quite difficult to predict the performance of the presented carrier phase recovery algorithms by theory, we resort to computer simulations.

Figure 32:
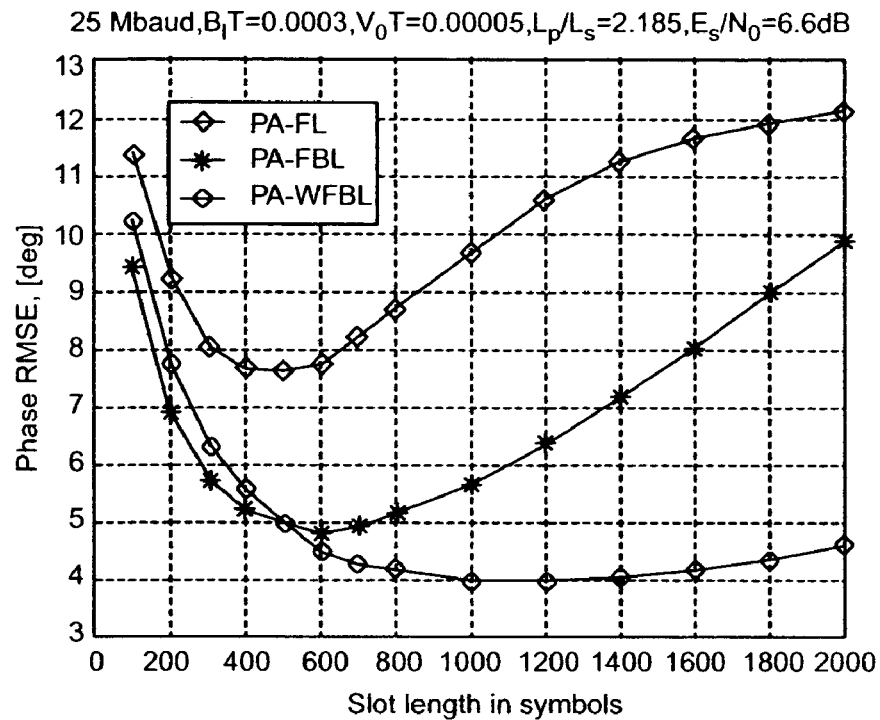
FIGS. 32 and 33 illustrate the phase root means square RMS performance of the PA-FL, PA-FBL and PA-WFBL as a function of the slot length with a residual normalized carrier frequency error of $5.10^{-5}$ (FIG. 32) and of $10^{-5}$ (FIG. 33)
Figure 33:
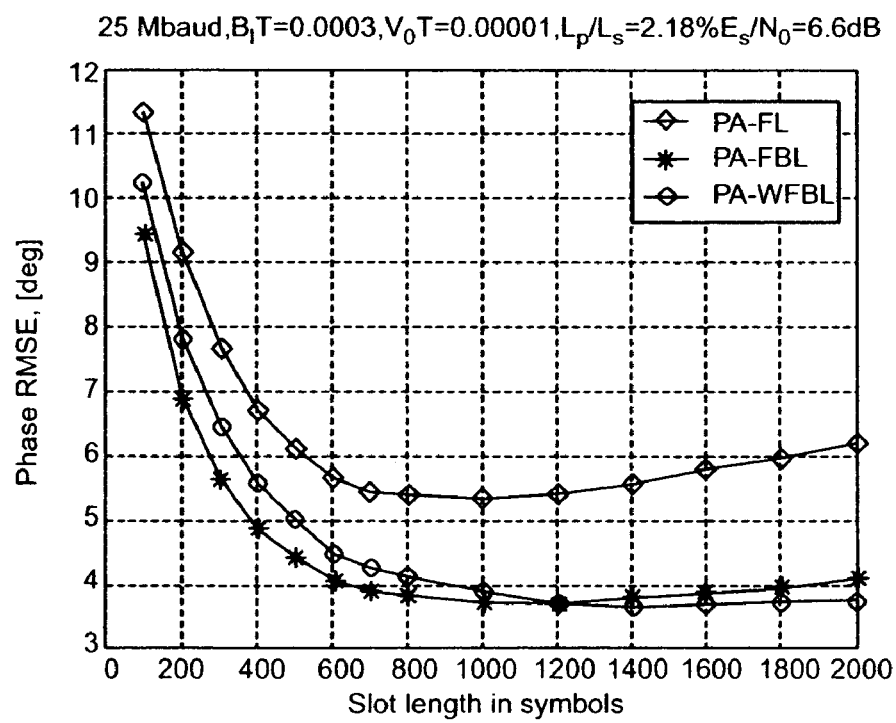

FIG. 32-FIG. 33 show the simulated jitter performance versus slot length at SNR=6.6 dB for a residual normalized carrier frequency offset of $5 \times 10^{-5}$ and $10^{-5}$, respectively. As shown, these feedback algorithms tend to be quite sensitive to carrier frequency errors as small as $10^{-5}$ (with the selected optimum normalized loop bandwidth of $3 \times 10^{-4}$). This imposes a very tight precision requirement to the carrier frequency recovery algorithm which can be very difficult to achieve.

Figure 34:
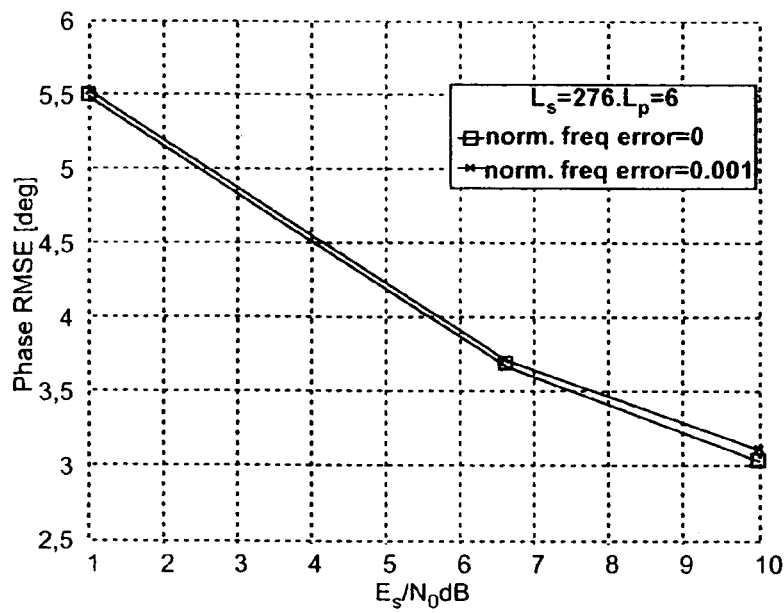
FIG. 34 illustrates the phase RMS performance of the PA-SWI algorithm with a residual normalized carrier frequency error of $10^{-3}$.

A better behavior is instead shown by the PA-SWI algorithm (see FIG. 34). As a matter of fact, the algorithm jitter performance is almost completely independent on carrier frequency errors, provided the phase unwrapper circuit does not experience a cycle slip. To prove this point, let us turn our attention to equation (26) which when solved allows to compute the coefficients of the Wiener interpolator, and that we re-write here for $k_s=0$, (which is the only equation that the PA-SWI needs to solve)

$$\sum_{m=-M}^{M} \gamma_0(m) R_{\hat{\theta}\hat{\theta}}(mL_s - pL_s) = R_{\theta\hat{\theta}}(-pL_s), \tag{39}$$

$$p = 0, \pm 1, \ldots, \pm M,$$

It is easy to show that the coefficients $\gamma_0(m)$ are an even function with respect to m. In fact, using the fact the correlation functions in (39) are even, the following identities apply:

$$\sum_{m=-M}^{M} \gamma_0(m) R_{\hat{\theta}\hat{\theta}}(mL_s - pL_s) =$$

$$R_{\theta\hat{\theta}}(-pL_s) \Rightarrow \sum_{m=-M}^{M} \gamma_0(m) R_{\hat{\theta}\hat{\theta}}(mL_s + pL_s) = R_{\theta\hat{\theta}}(pL_s) \Rightarrow$$

-continued $$\sum_{m=-M}^{M} \gamma_0(-m) R_{\hat{\theta}\hat{\theta}}(-mL_s - pL_s) = R_{\hat{\theta}\hat{\theta}}(pL_s) \Rightarrow \gamma_0(-m) = \gamma_0(m)$$

We will use this property to show that the performance of the PA-SWI estimator are in principle independent on a residual carrier frequency error. To this end, let us consider equation (21) that we re-write here for $k_s=0$ $$\hat{\theta}(l \cdot L) = \sum_{m=-M}^{M} \gamma_0(m) \hat{\theta}[(l+m) \cdot L_s] \quad (40)$$

When in the presence of a residual carrier frequency error $\Delta v$, it is easy to show that the FF-ML phase estimator produces, in a noiseless case, a phase estimate that is $\theta(m)+2\pi m \nu L_s T$. Substituting this result back into (40), yields $$\hat{\theta}(l \cdot L) = \sum_{m=-M}^{M} \gamma_0(m) \theta[m \cdot L_s] + \sum_{m=-M}^{M} \gamma_0(m) 2\pi m \Delta \nu L_s T \quad (41)$$

$$= \sum_{m=-M}^{M} \gamma_0(m) \theta[m \cdot L_s]$$

where the last identity follows from the property (that we have just shown) of the interpolator coefficients to be an even function of m.

A simple pilot-aided carrier frequency recovery scheme with good jitter performance and large acquisition range is proposed hereinbelow. The need of a pilot-aided scheme for carrier frequency recovery stems from the set of tight requirements that it needs to meet for DVB-S2 applications:

1) Normalized frequency acquisition range up to +/−0.2 (+/−5 MHz at 25 Mbaud symbol rate). For channel tuning +/−25 kHz can be considered;

2) Must be able to track frequency ramps up to 30 kHz/s;

3) Should preferably be modulation independent as in some applications the modulation format may be unknown and vary from frame to frame (Unicast/ACM);

4) Must be able to cope with phase noise;

5) Should have a reasonable acquisition time (though the "full" frequency transient from +/−5 MHz takes place only once at system start-up). Most of the known Non-Data-Aided (NDA) schemes have the following negative characteristics:

1) They are modulation dependent

2) The most precise schemes do not have the required frequency acquisition range (need double stage loops)

3) Distance from Cramer-Rao grows rapidly with the modulation order

4) Most require signal oversampling which could be unfeasible at high symbol rates 5) Some require heavy computational load Thus, the need to resort to a pilot-aided scheme.

A very simple but efficient scheme that can be used is the data-aided version of the Delay-and-Multiply technique [1] in which a second order DPLL makes use of an error signal out of a Frequency Error Detector (FED) with the following expression $$e(k) = Im\{z^{(p)}(k) c^{(p)*}(k) z^{(p)*}(k-2) c^{(p)}(k-2)\} \quad (42)$$

where $z^{(p)}(k)$ are the signal samples (2) at the matched filter output corresponding to the pilot symbols $c^{(p)}(k)$ (a good frame slot alignment is supposed to be in place prior to carrier frequency acquisition). The delay of two symbol periods in the algorithm has been selected in order to guarantee good tracking performance. As there are in general $L_p$ known symbols per pilot field, the number of samples available for the FED are $L_p-2$. During the data symbols the loop is kept frozen, i.e. the output of the $2^{nd}$ order loop filter is held for the whole duration of the data part of the slot.

Figure 35:
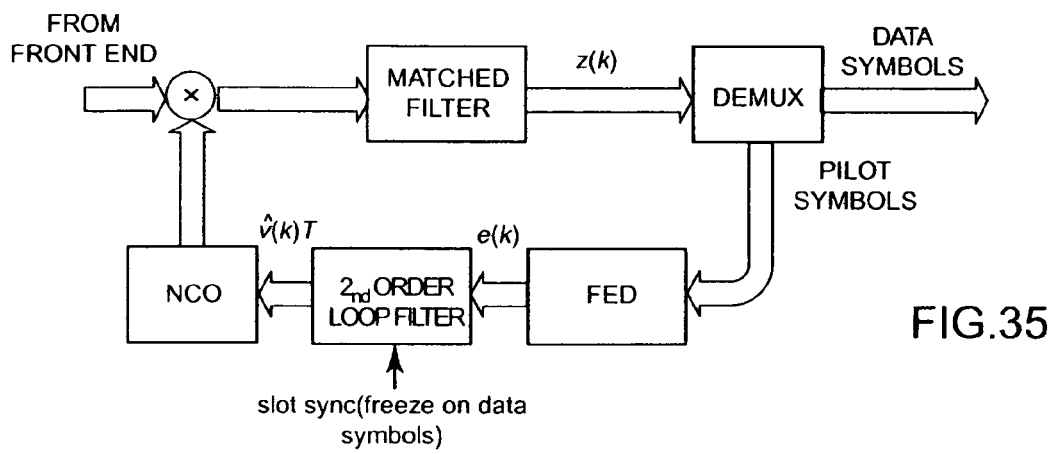
FIG. 35 is a block diagram of a carrier frequency synchronizer that may be used in conjunction with the phase carrier synchronization schemes according to the invention.

FIG. 35 shows the block diagram of the carrier frequency synchronizer.

Figure 36:
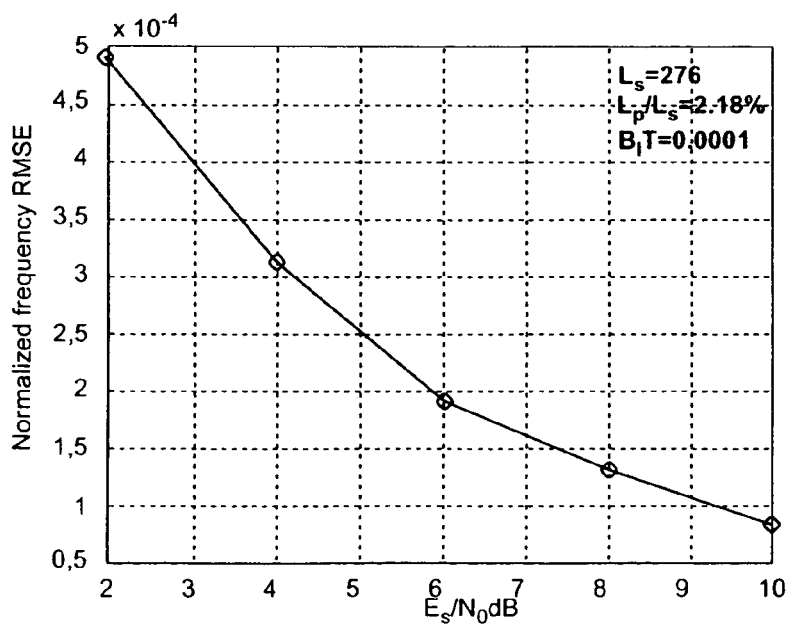
FIG. 36 illustrates the tracking performance of the proposed carrier frequency estimator.
Figure 37:
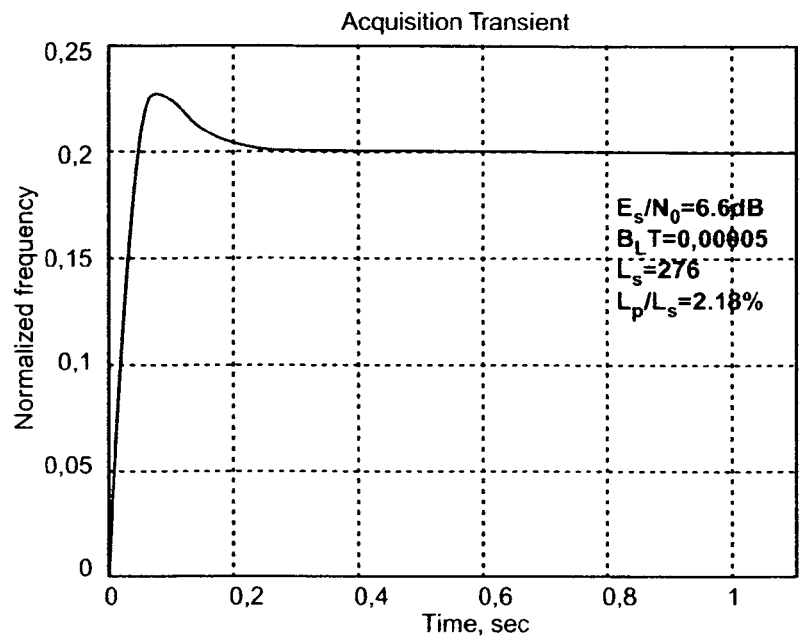
FIG. 37 illustrates the carrier frequency acquisition transient for a 25 Mbaud system.

Although, the tracking performance of the proposed carrier frequency synchronizer could be analytically derived, we chose here to report simulation results for a given slot configuration and assuming continuous operation mode (the loop freezing does not impact the jitter performance significantly). FIG. 36 shows the frequency jitter RMS as function of the SNR with a normalized loop bandwidth of $10^{-4}$. When working with slots, the effective loop bandwidth (for the purpose of acquisition time) reduces by a factor $(L_p-2)/L_s$. See for example FIG. 37 where the frequency acquisition is shown for SNR=6.6 dB and a normalized loop bandwidth of $5 \times 10^{-5}$. This value of the loop bandwidth has been chosen in order to make sure that the instantaneous frequency jitter exceeds the max value $1/(2L_s)$ imposed by equation (9) with a rate of less than 1 per hour of transmission at 25 Mbaud. To this end, a gaussian assumption of the PDF of the frequency jitter has been made.

To be remarked that as a result of a channel tuning, the carrier phase recovery algorithm should not experience any cycle slips as the max normalized frequency error that that implies is $10^{-3}$ for a 25 Mbaud system which is below the max value of $1/(2L_s)=1.8 \times 10^{-3}$ with $L_s=276$ for cycle slip free operations.

Figure 38:
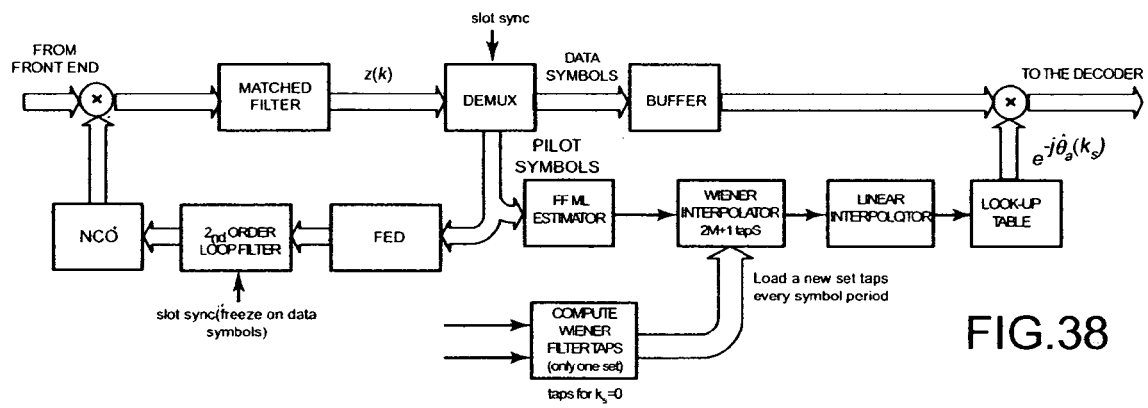
FIG. 38 is a block diagram of an example of an overall carrier synchronizer.

In this section we show simulation results of the full carrier synchronizer circuit where the phase recovery part is performed by the PA-SWI technique. The block diagram of the system is depicted in FIG. 38. The carrier frequency recovery scheme is first activated (after a proper slot alignment is reached) and after it has reached steady state (approximately after a number of symbols equal to $3L_s/[B_L T(L_p-2)]$ the carrier phase recovery circuit is switched on.

Figure 39:
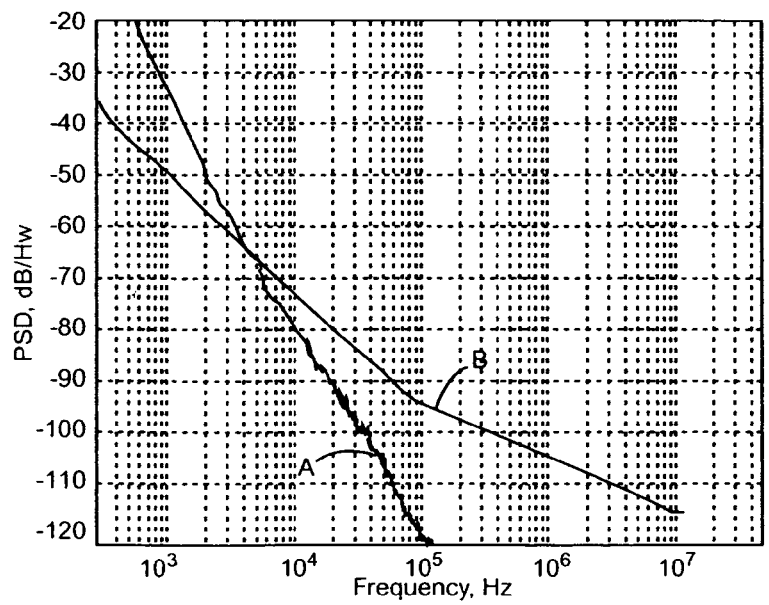
FIG. 39 shows the phase jitter power spectral density PSD due to carrier frequency recovery (curve A) compared to the one of the phase noise (curve B)

The system that we have simulated is a PA scheme with $L_s=276$, $L_p=6$ and $E_s/N_0=6.6$ dB. Steady state results show that the phase error jitter RMS in the overall system increases by only 0.1~0.2 deg due to the interactions between the carrier phase and frequency recovery. See also FIG. 39 where the PSD of the phase noise (mask) and the measured phase jitter introduced by the carrier frequency recovery loop, are shown. As seen, only at quite low frequencies (which can be easily tracked by the carrier phase estimator) the frequency jitter is greater than the phase noise.

Figure 40:
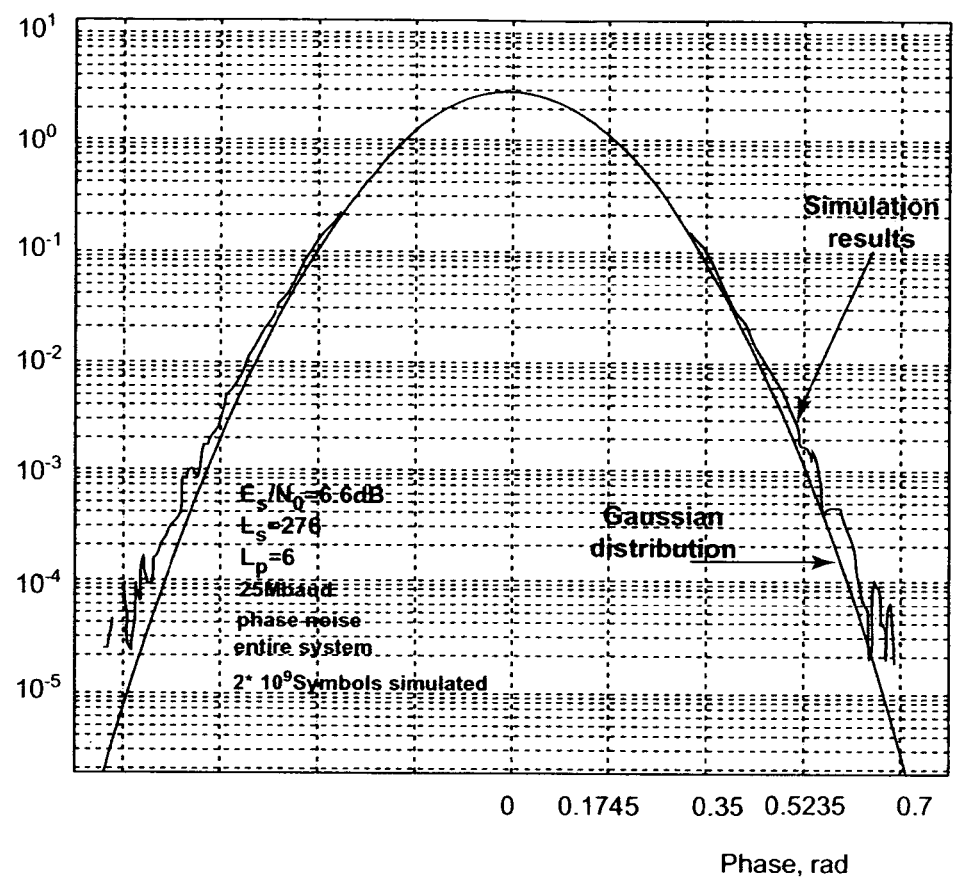
FIGS. 40 and 41 show the phase error PDF at the FF-ML estimator output respectively at Es/No=6.6 dB and Es/No=10 dB.
Figure 41:
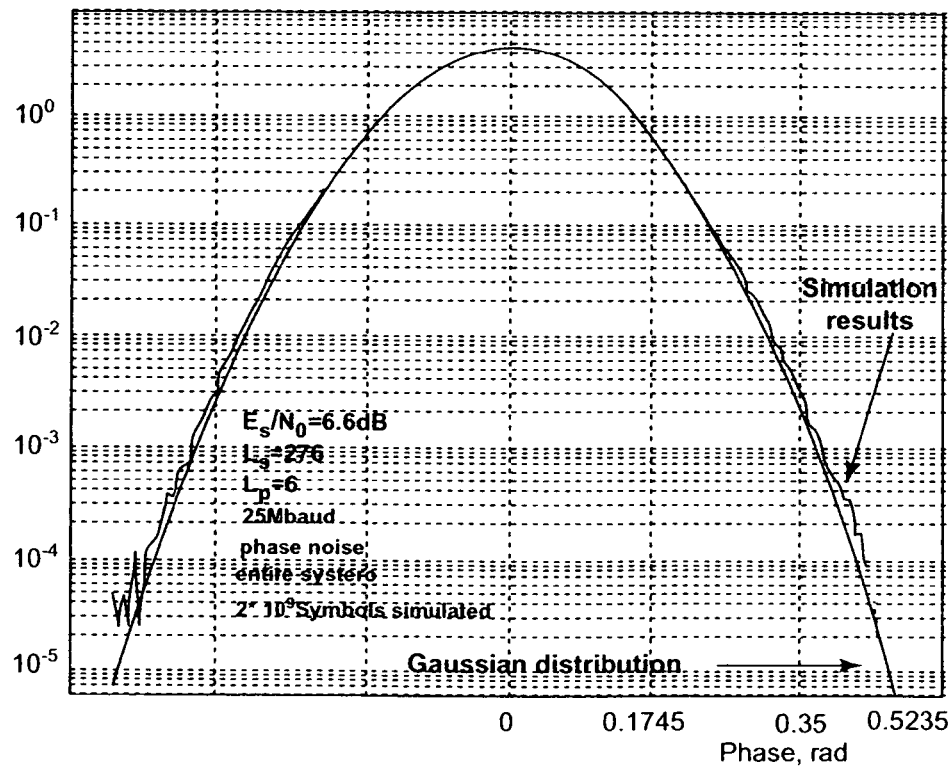

A very long simulation ($2 \times 10^9$ symbols) has been run to check for cycle slips. None were found at $E_s/N_0=6.6$ dB. Instead, when the SNR was lowered down to about 2 dB a number of cycle slips started to show up. This seems to be in conflict with the results of FIG. 12, which seems to indicate that the probability of cycle slips should be such that no cycle slip should take place over $2 \times 10^9$ at SNR=1 dB. However, one has to keep in mind that i) in deriving the results of FIG. 12 a high SNR assumption was made and ii) FIG. 12 takes into account only the effect of the thermal noise while these simulation results include also the phase noise and the phase jitter induced by the carrier frequency loop. As a further confirmation of the departure from the theory illustrated in FIG. 12, see FIG. 40 where the measured PDF of the phase error at the output of the FF-ML estimator for SNR=6.6 dB is compared with a gaussian distribution with the same variance. Note the departure from gaussianity of the tails. FIG. 40 shows the same results at SNR=10 dB. It is evident from the latter figure that the departure from gaussianity is of a less entity as the SNR increases which seems to confirm that the departure from gaussianity is mainly due to the lack of validity of the approximation used to derive equation (6).

The invention claimed is:

1. A process for providing a phase synchronization of a pilot aided carrier of an input digital signal z(k), said signal z(k) comprising signal fields comprised of $L_s$ symbol signals, namely a block of $L_P$ pilot symbol signals $Z^P_{(k)}$ and a data field of $(L_s - L_P)$ data symbol signals $Z^d_{(k)}$, $k_s$ being a symbol index for phase correction estimates, $k_s=0$ corresponding to the pilot block, and characterized in that it comprises for each signal field (l):

extracting the pilot symbol signals $Z^P_{(k)}$ and calculating an unwrapped phase estimate $\hat{\theta}(lL_s)$ over the pilot block of said signal field (l) and:

interpolating said unwrapped phase estimates of successive signal fields $(l, l+1 \ldots)$ only for $k_s=0$ with a Wiener interpolator having M taps to obtain interpolated phase estimates having a Minimum Mean Square Error;

providing linear interpolation between said interpolated phase estimates to obtain phase correction estimates ($\hat{\theta}(k_s)$) over the data field of said signal fields;

calculating from said phase correction estimates ($\hat{\theta}(k_s)$) a phase correction ($e^{-j\hat{\theta}(k_s)}$) to be applied to said signal z(k).

2. A process as in claim 1, wherein the Wiener filter coefficients γ of said taps are determined using the phase noise (PSD) and the signal to noise ratio (SNR) of the signal.

3. A process as in claim 2, wherein said phase noise is the worst case phase noise and said signal to noise ratio is the nominal signal to-noise ratio.

4. A process as in claim 1, wherein the Wiener filter taps are scaled by the ratio $$1 \bigg/ \sum_{m=-M}^{M} \gamma(m)$$

so that the sum of the coefficients of the Wiener filter taps is equal to 1.

5. A process for providing a phase synchronization of a pilot aided carder of an input digital signal z(k), said signal z(k) comprising signal fields comprised of $L_s$ symbol signals, namely a block of $L_P$ pilot symbol signals $Z^P_{(k)}$ and a data field of $(L_s - L_P)$ data symbol signals $Z^d_{(k)}$, and characterized in that it comprises for each signal field (l):

extracting the pilot symbol signals $Z^P_{(k)}$ and calculating an unwrapped phase estimate $\hat{\theta}(lL_s)$ over the pilot block of said signal field (l) and:

interpolating said unwrapped phase estimates of successive signal fields $(l, l+1 \ldots)$ with a Wiener interpolator having M taps to obtain interpolated phase estimates having a Minimum Mean Square Error;

providing linear interpolation between said interpolated phase estimates to obtain phase correction estimates ($\hat{\theta}(k_s)$) over the data field of said signal fields;

calculating from said phase correction estimates ($\hat{\theta}(k_s)$) a phase correction ($e^{-j\hat{\theta}(k_s)}$) to be applied to said signal z(k), wherein the Wiener filter coefficients γ of said taps are determined using the phase noise (PSD) and the signal to noise ratio (SNR) of the signal and wherein said phase noise is the worst case phase noise and said signal to noise ratio is the nominal signal to-noise ratio.

6. A process for providing a phase synchronization of a pilot aided carrier of an input digital signal z(k), said signal z(k) comprising signal fields comprised of $L_s$ symbol signals, namely a block of $L_P$ pilot symbol signals $Z^P_{(k)}$ and a data field of $(L_s - L_P)$ data symbol signals $Z^d_{(k)}$, and characterized in that ft comprises for each signal field (l):

extracting the pilot symbol signals $Z^P_{(k)}$ and calculating an unwrapped phase estimate $\hat{\theta}(lL_s)$ over the pilot block of said signal field (l) and:

interpolating said unwrapped phase estimates of successive signal fields $(l, l+1 \ldots)$ with a Wiener interpolator having M taps to obtain interpolated phase estimates having a Minimum Mean Square Error;

providing linear interpolation between said interpolated phase estimates to obtain phase correction estimates ($\hat{\theta}(k_s)$) over the data field of said signal fields;

calculating from said phase correction estimates ($\hat{\theta}(k_s)$) a phase correction ($e-j\hat{\theta}(k^s)$) to be applied to said signal z(k), wherein the Wiener filter taps are scaled by the ratio $$1 \bigg/ \sum_{m=-M}^{M} \gamma(m)$$

so That the sum of the coefficients of the Wiener filter taps is equal to 1.

* * * * *